United States Patent
Choi

(10) Patent No.: US 10,496,087 B2
(45) Date of Patent: Dec. 3, 2019

(54) MOBILE TERMINAL AND METHOD OF CONTROLLING THE SAME

(71) Applicant: LG ELECTRONICS INC., Seoul (KR)

(72) Inventor: Kyungdong Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 180 days.

(21) Appl. No.: 15/660,871

(22) Filed: Jul. 26, 2017

(65) Prior Publication Data

US 2018/0046179 A1 Feb. 15, 2018

(30) Foreign Application Priority Data

Aug. 10, 2016 (KR) .................. 10-2016-0101862

(51) Int. Cl.
*G05D 1/00* (2006.01)
*G05D 1/06* (2006.01)
(Continued)

(52) U.S. Cl.
CPC ......... *G05D 1/0016* (2013.01); *B64C 39/024* (2013.01); *G05D 1/0038* (2013.01); *G05D 1/0061* (2013.01); *G05D 1/0676* (2013.01); *G06F 3/016* (2013.01); *G06F 3/017* (2013.01); *G06F 3/0414* (2013.01); *G06F 3/0488* (2013.01); *G06F 3/04883* (2013.01);
(Continued)

(58) Field of Classification Search
CPC .. B64C 39/024; G05D 1/0016; G05D 1/0038; G05D 1/0061; G06F 3/016; G06F 3/017; G06F 3/0414; G06F 3/0488; G06F 3/04883
See application file for complete search history.

(56) References Cited

U.S. PATENT DOCUMENTS 9,412,278 B1 * 8/2016 Gong ...................... G06F 16/29
2014/0008496 A1 1/2014 Ye et al.
(Continued)

FOREIGN PATENT DOCUMENTS

KR 101117207 2/2012

OTHER PUBLICATIONS

PCT International Application No. PCT/KR2017/007410, Notification of Transmittal of the International Search Report and the Written Opinion of the International Searching Authority, or Declaration dated Oct. 19, 2017, 11 pages.

*Primary Examiner* — Anshul Sood
(74) *Attorney, Agent, or Firm* — Lee, Hong, Degerman, Kang & Waimey

(57) ABSTRACT

The present invention provides a mobile terminal and a method of controlling the same. A mobile terminal according to an embodiment of the present invention includes a communication unit for transmitting/receiving data to/from a drone, an input unit for receiving a first signal for controlling operation of the drone, a display for displaying at least one of data received from the drone and a UI for operation control of the drone, and a controller for executing an application for operation control of the drone, transmitting the received first signal for controlling operation of the drone to the drone and transmitting a second signal for controlling operation of the drone to the drone according to generation of a predetermined event.

9 Claims, 27 Drawing Sheets

(a) (b)

(51) Int. Cl.
*G06F 3/041* (2006.01)
*G06F 3/0488* (2013.01)
*B64C 39/02* (2006.01)
*G06F 3/01* (2006.01)
*G06F 3/147* (2006.01)
*G06K 9/00* (2006.01)
G06F 3/0484 (2013.01)
G06F 3/16 (2006.01)
G09G 3/00 (2006.01)

(52) U.S. Cl.
CPC ......... *G06F 3/147* (2013.01); *G06K 9/00087* (2013.01); *B64C 2201/127* (2013.01); *B64C 2201/141* (2013.01); *B64C 2201/146* (2013.01); *G06F 3/04842* (2013.01); *G06F 3/167* (2013.01); *G09G 3/003* (2013.01); *G09G 2354/00* (2013.01)

(56) References Cited

U.S. PATENT DOCUMENTS

| | | |
|---|---|---|
| 2014/0254896 A1 | 9/2014 | Zhou et al. |
| 2016/0016672 A1 | 1/2016 | Matos |
| 2016/0139595 A1 | 5/2016 | Yang et al. |
| 2017/0183096 A1* | 6/2017 | Meinhart .............. B64C 39/024 |
| 2017/0337826 A1* | 11/2017 | Moran ................... G01S 1/042 |

* cited by examiner

FIG. 5
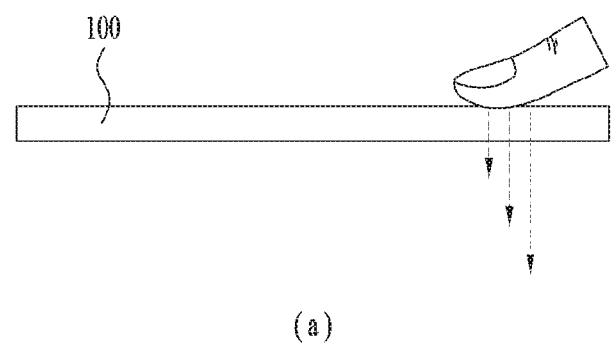
(a)
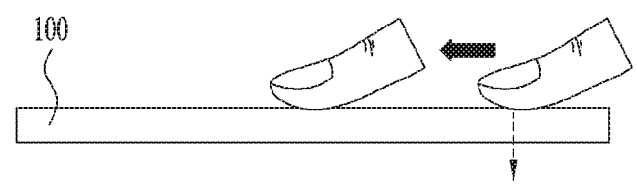
(b)
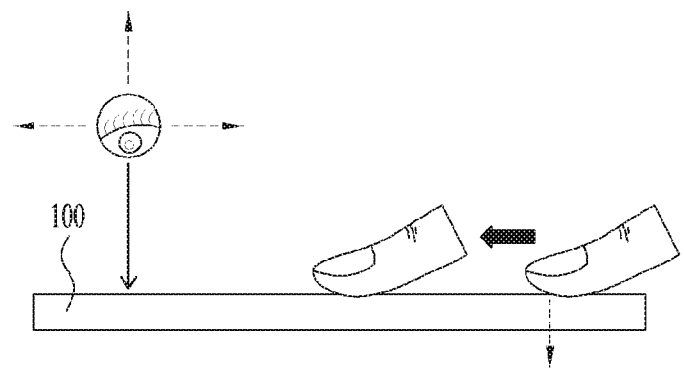
(c)

(a)　　　　　　　(b)　　　　　　　(c)

FIG. 7
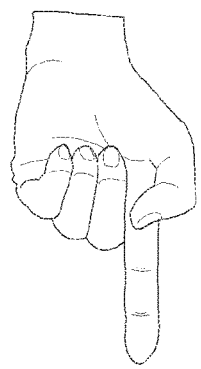
(a)
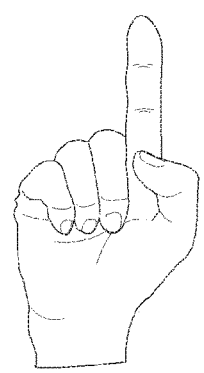
(b)
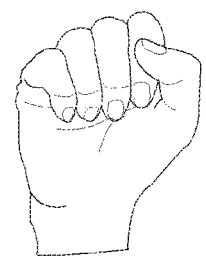
(c)
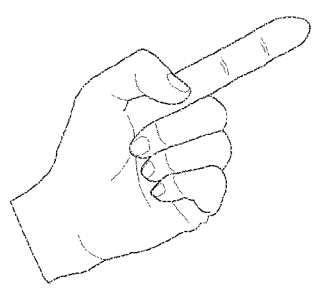
(d)
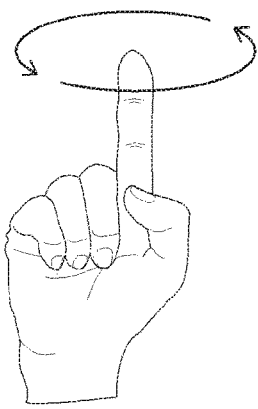
(e)
(f)

FIG. 8

| 1. Takeoff
2. Move upward
3. Move upward
4. Landing | 1. Low speed
2. Average speed
3. Maximum speed | 1. Move forward
2. Move backward
3. Orbital flight | 1. Return
2. Move to maximum
boundary area
3. Fix position
and altitude |
|---|---|---|---|
| (a) | (b) | (c) | (d) |

FIG. 12
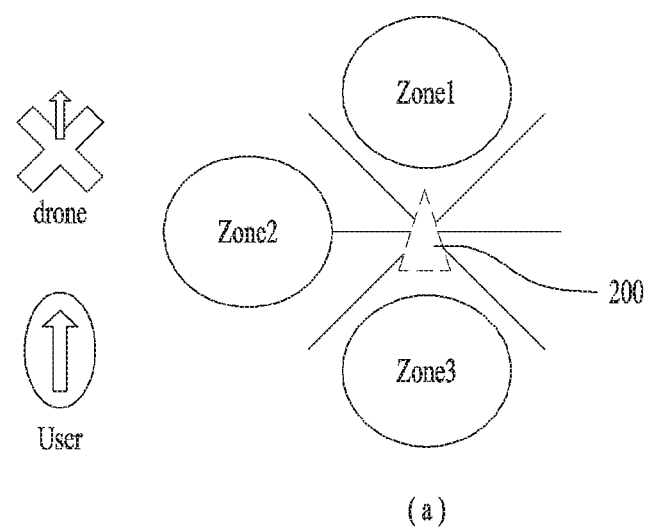
(a)
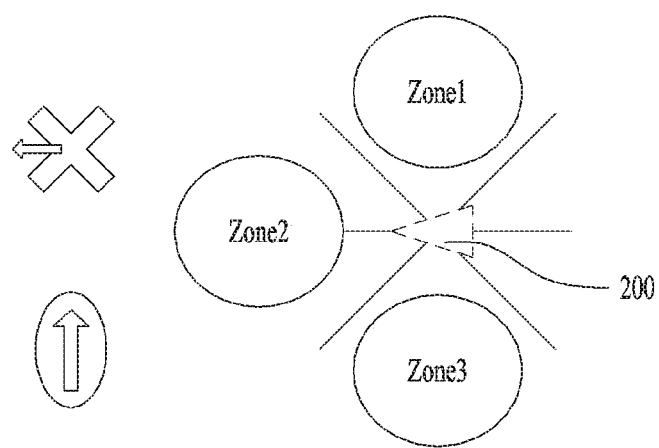
(b)

FIG. 18
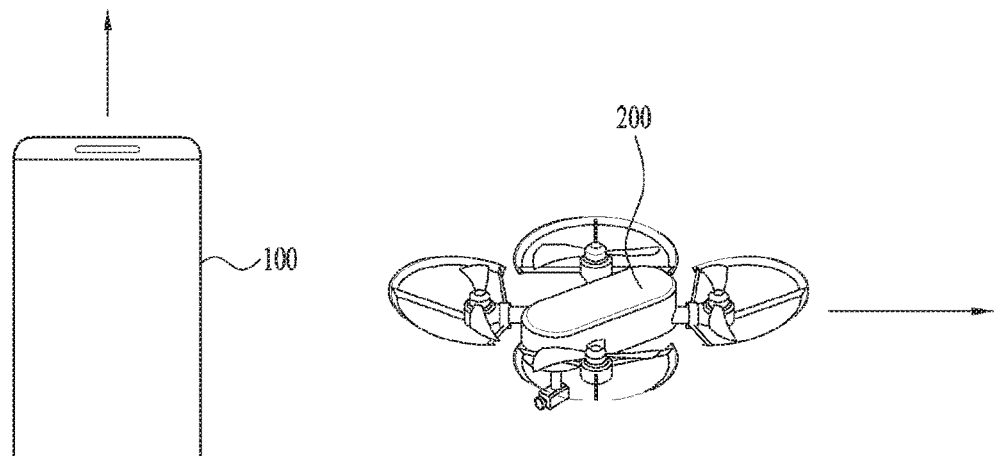
(a)
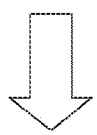
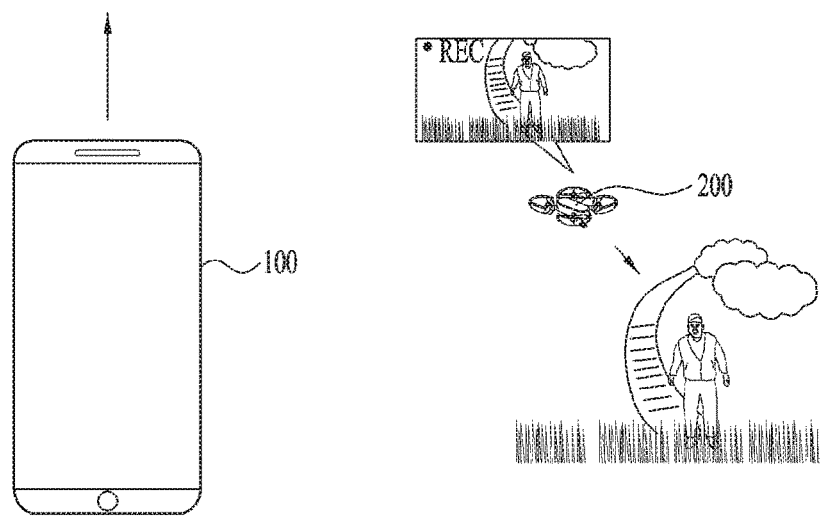
(b)

(a)             (b)

FIG. 21
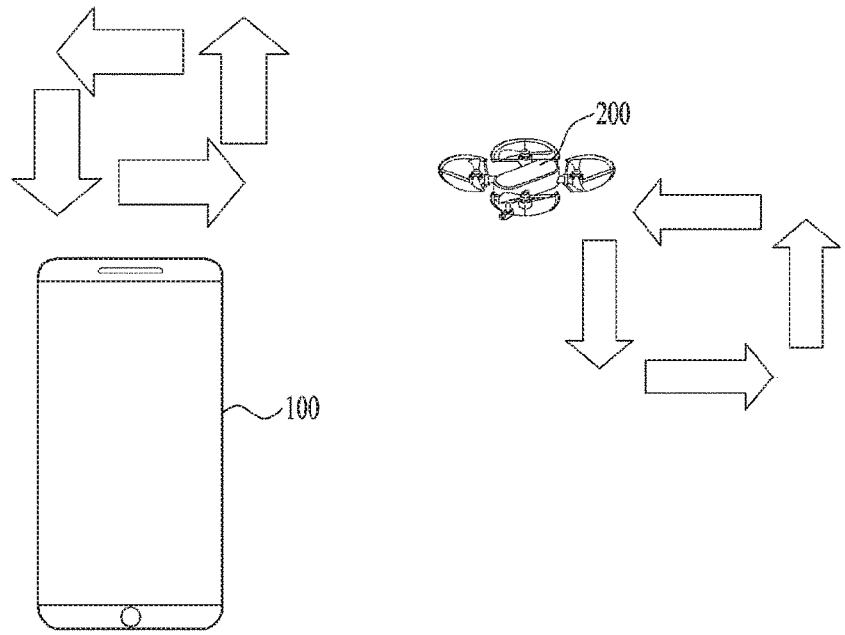
(a)
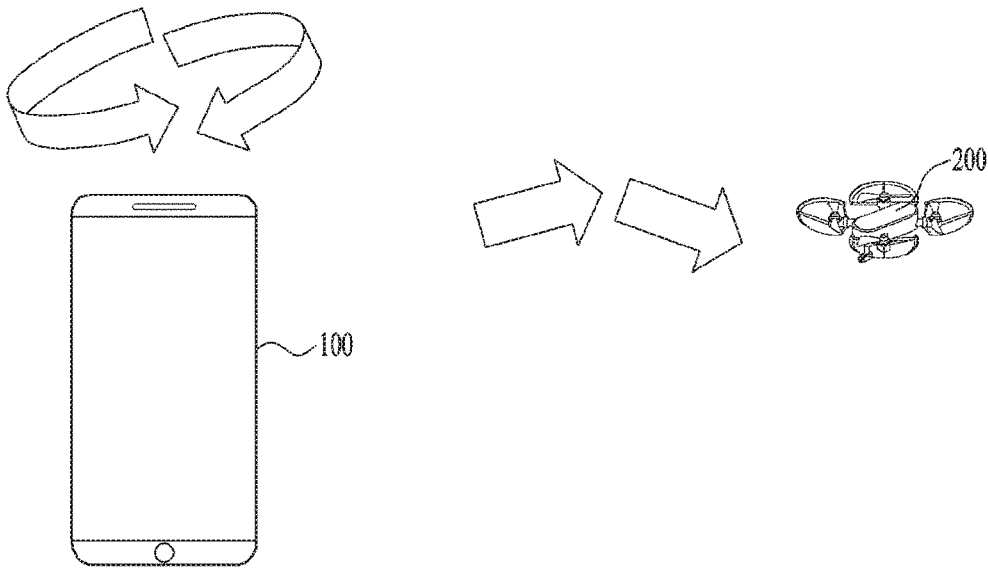
(b)

FIG. 24
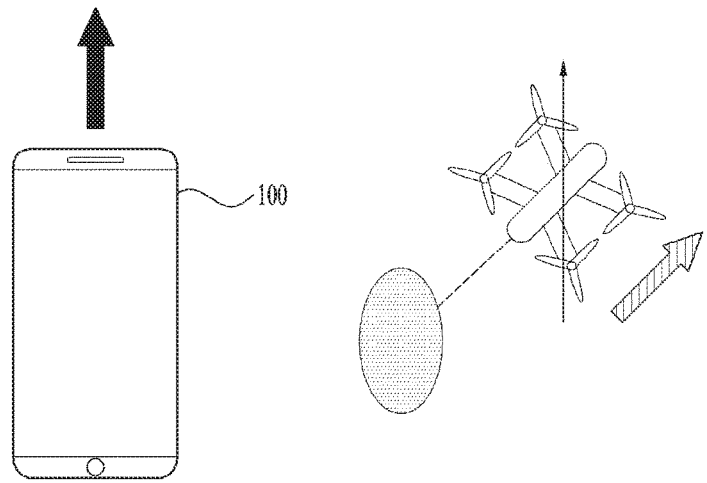
(a)
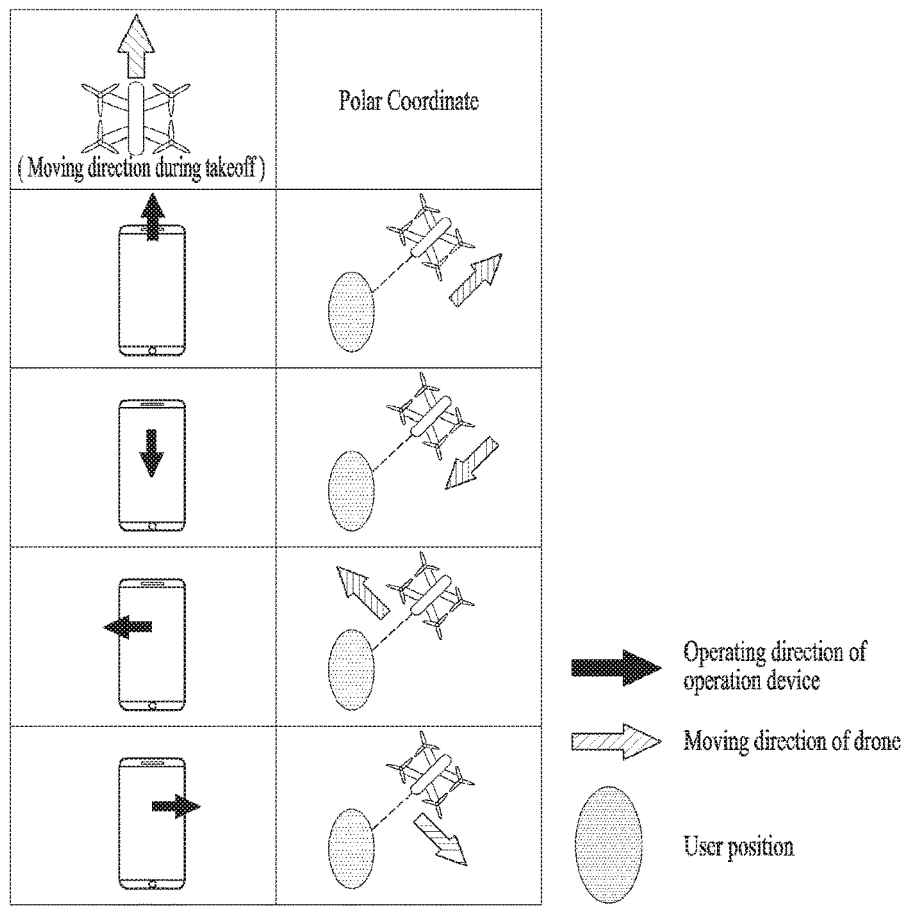
(b)

FIG. 25
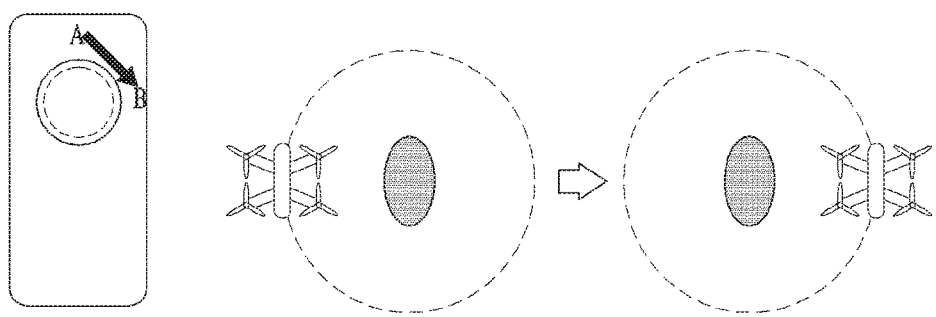
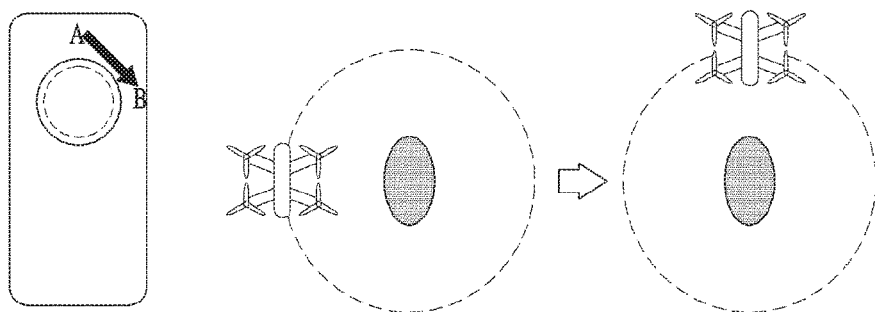
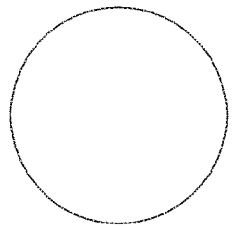

MOBILE TERMINAL AND METHOD OF CONTROLLING THE SAME

CROSS REFERENCE TO RELATED APPLICATIONS

Pursuant to 35 U.S.C. § 119(a), this application claims the benefit of earlier filing date and right of priority to Korean Application No. 10-2016-0101862, filed on Aug. 10, 2016, the contents of which are all hereby incorporated by reference herein in its entirety.

BACKGROUND OF THE INVENTION

Field of the Invention

The present invention relates to a mobile terminal and a method of controlling the same.

Discussion of the Related Art

Individuals and companies are increasingly using drones. A drone refers to a flying object such as an unmanned airplane or helicopter which flies according to a radio control signal, for example.

A drone can be equipped with a camera and can transmit images captured using the camera. In general, a user operates a drone using an additionally provided drone operating device. In other words, an additional operating device is necessary to operate a drone and thus requires additional costs.

Such a problem can be solved by using a mobile terminal of a user who wants to operate the drone. However, there is also a problem in operating a drone using a mobile terminal. For example, considering continuously posed risk of drone flight and various factors such as functions or usage frequency of the mobile terminal, it may not be possible to immediately or appropriately cope with various events of the mobile terminal during a drone operating process. Since drones fly at high speed, danger of accident is very high when users do not immediately or appropriately cope with operation of the drones. Accordingly, using a mobile terminal to operate a drone may cause risk of flying a drone to increase and may limit utilization of the drone.

SUMMARY OF THE INVENTION

The present invention has been devised to solve the aforementioned problem or risk.

An object of the present invention is to control a drone more safely using a mobile terminal of a user.

Another object of the present invention is to control the drone stably in various situations and events of the mobile terminal.

Yet another object of the present invention is to control the drone through the mobile terminal without additional costs, improve utilization convenience to enable drone control while using functions of the mobile terminal and to secure drone control stability.

The technical problems solved by the present invention are not limited to the above technical problems and other technical problems which are not described herein will become apparent to those skilled in the art from the following description.

A mobile terminal and a method of controlling the same are disclosed in the specification.

A mobile terminal according to an embodiment of the present invention includes: a communication unit for transmitting/receiving data to/from a drone; an input unit for receiving a first signal for controlling operation of the drone; a display for displaying at least one of data received from the drone and a UI for operation control of the drone; and a controller for executing an application for operation control of the drone, transmitting the received first signal for controlling operation of the drone to the drone and transmitting a second signal for controlling operation of the drone to the drone according to generation of a predetermined event.

Means for solving the technical problems of the present invention are not limited to the above means and other means which are not described herein will become apparent to those skilled in the art from the following description.

The present invention has the following effects.

According to at least one embodiment of the present invention, it is possible to control a drone more safely using a mobile terminal of a user.

According to at least one embodiment of the present invention, it is possible to control the drone stably in various situations and events generated in the mobile terminal.

According to at least one embodiment of the present invention, it is possible to control the drone through the mobile terminal without additional costs, improve utilization convenience to enable drone control while using functions of the mobile terminal and secure drone control stability.

The effects of the present invention are not limited to the above-described effects and other effects which are not described herein may be derived by those skilled in the art from the following description of the embodiments of the present invention. That is, effects which are not intended by the present invention may be derived by those skilled in the art from the embodiments of the present invention.

BRIEF DESCRIPTION OF THE DRAWINGS

FIG. 5 illustrates a drone control method according to force-touch input as one of events according to the present invention.

FIG. 7 illustrates a drone control method according to an event in accordance with the present invention or gesture input in association therewith.

FIG. 8 illustrates examples of a message window for drone operation control due to an event according to the present invention.

FIG. 12 illustrates a method of controlling a heading of a drone according to an embodiment of the present invention.

FIG. 18 illustrates a method of controlling a drone upon sensing an object according to an embodiment of the present invention.

FIG. 21 illustrates a method of controlling a drone using a preset pattern according to an embodiment of the present invention.

FIGS. 23 and 24 illustrate a method of controlling a motion of a drone using a mobile terminal according to an embodiment of the present invention.

FIG. 25 illustrates a method of controlling a rotating motion of a drone using a mobile terminal according to the present invention.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
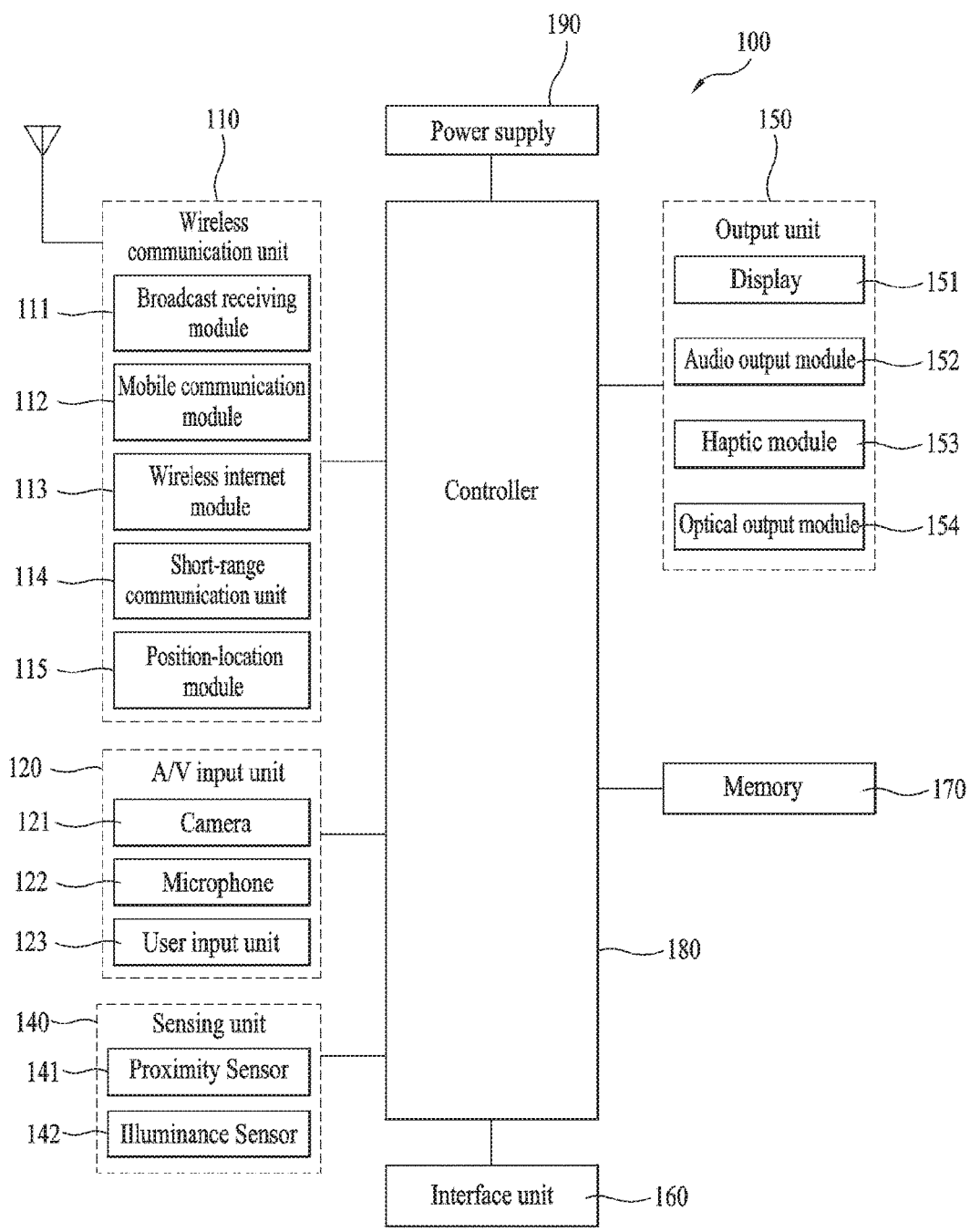
FIG. 1a is a diagram for explaining a mobile terminal related to the present invention.
Figure 1B:
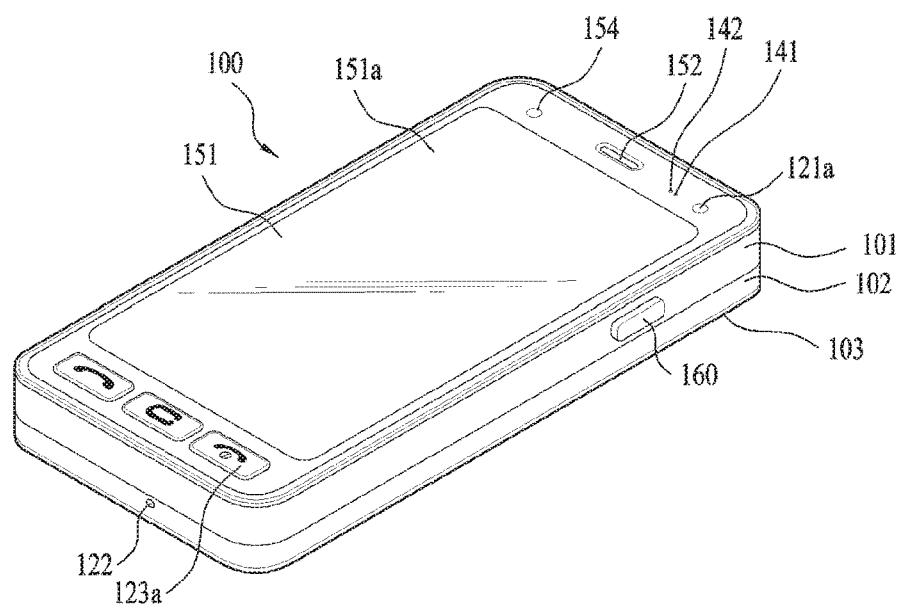
FIGS. 1b and 1c illustrate an example of a mobile terminal related to the present invention, viewed from different directions.
Figure 1C:
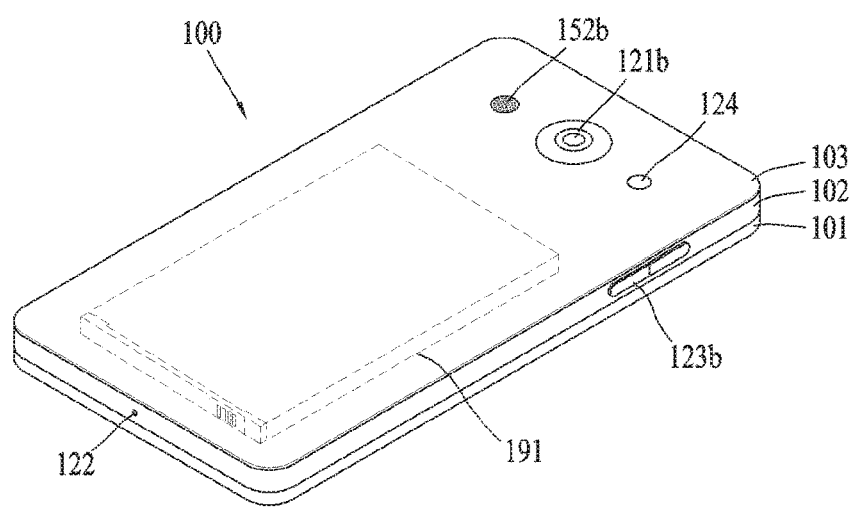

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast- Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

A description will be given of various embodiments of a mobile terminal 100 and a method of controlling the same. Those skilled in the art may complement or modify embodiments which will be described later with reference to previously described figures.

Figure 2:
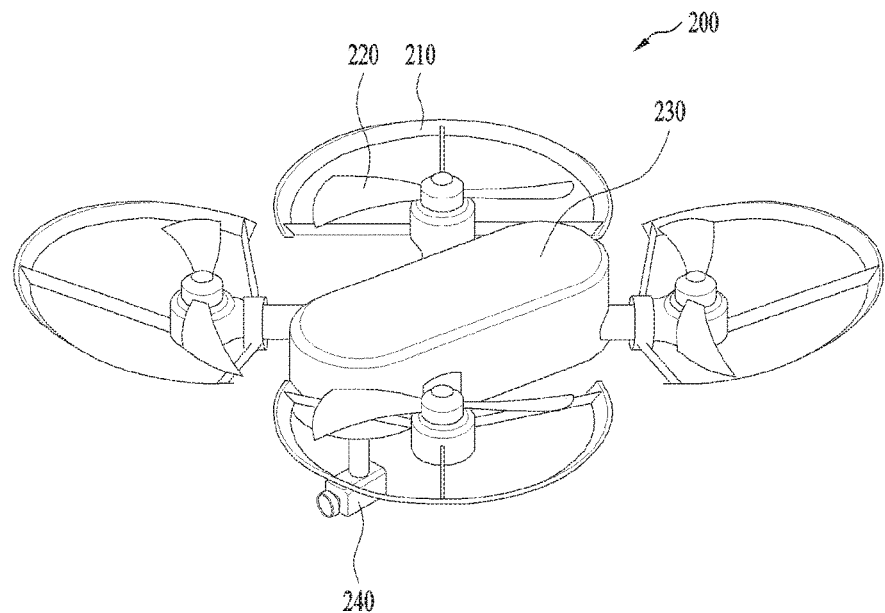
FIG. 2 shows the appearance of a drone controlled by a terminal according to an embodiment of the present invention.

FIG. 2 illustrates an example of the appearance of a drone 200 controlled using a mobile terminal according to the present invention.

Referring to FIG. 2, the drone 200 includes propeller guards 210, propellers 220, a main body 230 and a camera 240. However, the shape of the drone 200 shown in FIG. 2 is exemplary and the scope of the present invention is not limited thereto. For example, the present invention is applicable to various types of drones such as a tricopter using three propellers, a quadcopter using four propellers as shown in FIG. 2, and an octacopter using eight propellers. Furthermore, the present invention is applicable to drones having a shape using one or two propellers.

The propeller guard 210 is a component for preventing people or animals from being injured due to operation of the propellers 220 and may be omitted.

The propellers 220 and the camera 240 operate in response to a control signal of the main body 230 and the main body 230 includes a wireless communication module which can communicate with the mobile terminal 100. According to an embodiment, the camera 240 may be controlled on the basis of a control signal different from the control signal of the main body 230.

Figure 3:
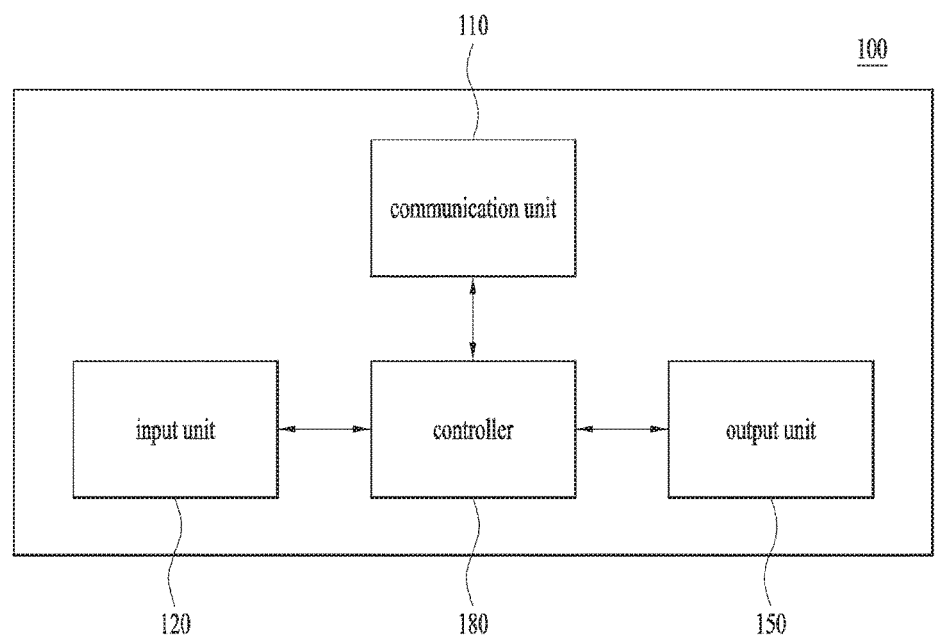
FIG. 3 is a block diagram of a mobile terminal according to an embodiment of the present invention.

FIG. 3 is a block diagram of the mobile terminal 100 according to an embodiment of the present invention.

The mobile terminal 100 for controlling a drone according to an embodiment of the present invention includes a communication unit 110 for transmitting/receiving data to/from a drone 200, an input unit 120 for receiving a first signal for controlling operation of the drone 200, a display 151 for displaying at least one of data received from the drone 200 and a UI for operation control of the drone 200, and a controller 180 for executing an application for operation control of the drone 200, transmitting the received first signal for controlling operation of the drone 200 to the drone 200 and transmitting, to the drone 200, a second signal for controlling operation of the drone 200 according to generation of a predetermined event. The second signal may be automatically transmitted to the drone 200. In addition, the second signal may be varied according to the generated event. Further, the controller 180 may control the UI for operation control of the drone 200 to be displayed depending on the type of the generated predetermined event and determine the second signal to be transmitted through the displayed UI.

The controller may control the second signal to be varied according to the event, control the UI for operation control of the drone to be displayed depending on the type of the predetermined event and determine the second signal to be transmitted through the displayed UI.

When the predetermined event is fingerprint data input, the controller may identify a user through input fingerprint data, control the moving drone to maintain the current position and altitude thereof and to directly land at the current position or to land at the position of the mobile terminal, an initial takeoff position or a predetermined position when the identified user does not have the authority to control operation of the drone, and display a UI including detailed function items related to operation control of the drone and finish control operation control of the drone or control the drone to maintain the current position and altitude until next fingerprint data is input or to move to a predetermined position and altitude when the identified user has permission to control operation of the drone.

When force-touch (or 3D touch) input is received after or along with the fingerprint data input, the controller may display the UI for operation control of the drone according to the force-touch input. The UI includes at least one of altitude control and forward/backward movement control depending on force-touch input. When a drag signal is received along with the force-touch input, the controller may control the drone to move in a direction corresponding to the received drag signal.

The controller may transmit a result of identification of the user of the fingerprint data to the drone according to the fingerprint data input, receive a feedback signal from the drone according to whether the user is an authorized user, and output at least one of haptic data, pop-up data and audio data in response to the received feedback signal.

The controller may provide the UI for operation control of the drone differently when the fingerprint data is input through a home button and input through a touchscreen constituting the display.

When the event is execution of a text or call application, the controller may transmit the UI for operation control of the drone or a control signal according to voice or gesture input of the user of the mobile terminal, and the UI or the control signal may include at least one of lowering altitude, landing, takeoff, gaining altitude, execution of around-view, moving to a target at a fixed position and fixed altitude, and taking a selfie.

When the event corresponds to execution of a camera application, the controller may activate at least one of cameras of the drone when the drone includes a plurality of cameras, request reception of a captured image of the drone, display image data received from the drone on the display and control the angle of the drone or the at least one camera in the drone to be changed upon selection of the displayed image data, according to execution of the camera application.

When the event is related to a battery state and battery charge is lower than a predetermined threshold value, the controller may display the UI for operation control of the drone or transmit a control signal for controlling the drone to perform a predetermined operation, periodically transmit the current position of the mobile terminal until the mobile terminal is powered off due to the battery or detect a mobile terminal for drone control around the drone or the mobile terminal, and determine whether the detected mobile terminal is a registered device and an authorized device.

The drone may maintain the current position and altitude for a predetermined time and land at the initial takeoff position, the current position or a predetermined landing position when the drone does not receive a control signal from the mobile terminal for a predetermined time or connection between the drone and the mobile terminal is cancelled.

FIG. 3 shows only components related to control of the drone 200 among the components shown in FIG. 1a.

Referring to FIG. 3, the mobile terminal 100 includes the communication unit 110, the input unit 120, an output unit 150 and the controller 180. The mobile terminal 100 may be combined with a separate holder for convenience of control of the drone 200 according to the present invention.

The communication unit 110 transmits/receives data to/from the drone 200. The communication unit 110 receives image data captured through a camera, audio data collected through a microphone of the drone 200, data sensed through a sensing unit of the drone 200, and the like. For example, the communication unit 110 can receive data such as position information and flight information of the drone 200 and transmit operation control data such as a movement command. The mobile terminal 100 displays image data, audio data and sensing data received from the drone 200 through the output unit.

The input unit 120 receives a command for controlling operation of the drone 200. The input unit 120 may receive the command for controlling operation of the drone 200 through touch input applied to the touchscreen of the mobile terminal 100. The input unit 120 may be a component separated from the mobile terminal 100 and connected to the mobile terminal 100 in a wired/wireless manner or directly connected to the mobile terminal 100 (e.g., a joystick connected to the mobile terminal 100).

The mobile terminal 100 may receive input for controlling forward/backward, up/down and left/right movement of the drone 200 through the input unit 120. The mobile terminal 100 may also receive a rotating motion control input for the drone 200 through the input unit 120.

When the mobile terminal 100 is connected to an external display device serving as a display, the mobile terminal 100 may output image data received through the drone 200 using the external display device. Here, the external display device may be a digital TV receiver, for example.

The mobile terminal can control operation of the drone 200 using a 4-axis sensor including forward, reverse, left and right axes or a 6-axis sensor including forward, reverse, left, right, upward and downward axes. The mobile terminal 100 may use a 9-axis sensor to control the drone 200 in addition to the 4-axis and 6-axis sensors.

A command corresponding to a direction input through the input unit 120 is transmitted to the drone 200 through the communication unit 110. The drone 200 operates according to the transmitted command. For example, when a command corresponding to the backward direction is input through the input unit 120, the drone 200 can fly backward. The drone 200 can fly forward, backward, to the left and to the right in response to commands corresponding to forward, backward, left and right directions. Further, the drone 200 can fly up and down in response to commands corresponding to upward and downward directions transmitted thereto. In addition, the drone 200 may rotate in response to a command corresponding to a rotating direction transmitted thereto. Here, the heading of the drone 200 may be changed according to the command corresponding to the rotating direction. Accordingly, the heading of the drone 200 may not correspond to a direction in which the drone 200 moves relative to the mobile terminal 100.

The input unit 120 may simultaneously receive a plurality of direction control commands. For example, the input unit 120 can simultaneously receive forward direction and upward direction control commands. The drone 200 can move upward while moving forward in response to the input commands.

The controller 180 may detect an obstacle on the basis of data received from the drone 200 and calculate a distance between the drone 200 and the obstacle. The drone 200 may detect an obstacle within a specific distance. The drone 200 may transmit a signal to the mobile terminal 100 when the distance to the obstacle is within a predetermined distance. Upon reception of information on the distance between the drone 200 and the obstacle from the drone 200, the mobile terminal 100 may determine whether the distance is within the predetermined distance on the basis of the information on the distance between the drone 200 and the obstacle. Alternatively, the drone 200 may transmit sensed information to the mobile terminal 100 and the mobile terminal 100 may determine whether an obstacle is present and calculate a distance between the drone 200 and the obstacle on the basis of the received information. The controller 180 can control the output unit 180 to output a predetermined signal when the calculated distance between the drone 200 and the obstacle is within the predetermined distance. For example, the predetermined signal may be a signal for outputting a haptic effect. Here, the haptic effect may be vibration, alarm or the like, for example.

In addition, the controller 180 may transmit the UI for drone operation control and/or a control signal to the drone 200 when an event is generated in the mobile terminal 100.

The output unit 150 may output a predetermined signal. The drone 200 flies in a direction input through the mobile terminal 100. As described above, the mobile terminal 100 can detect an obstacle and calculate a distance between the drone 200 and the obstacle. Upon determining that the distance between the drone 200 and the obstacle is within a predetermined distance, the output unit 150 can output a signal for outputting a haptic effect under the control of the controller 180. That is, the output unit 150 can output a haptic effect. Accordingly, the user can feel the haptic effect when the drone 200 approaches within the predetermined distance from the obstacle.

Alternatively, upon determining that the distance between the drone 200 and the obstacle is within the predetermined distance, the output unit 150 may output a signal for outputting a haptic effect for a direction in which the user applies force in order to control the drone 200. That is, the output unit 150 can output a haptic effect for the operating direction of the user. The mobile terminal 100 may control a spring such that force is applied in a direction opposite to a direction in which the user operates the input unit 120 upon determining that the distance between the drone 200 and the obstacle is within the predetermined distance. Accordingly, the user can feel as if the obstacle actually exists when operating the input unit 120.

The aforementioned control operation related to the obstacle is equally or similarly applicable to a predetermined event generated in the mobile terminal 100.

Meanwhile, at least one camera included in the drone 200 as well as operation of the drone 200 can be controlled through touch input applied to the touchscreen of the mobile terminal 100.

A method of controlling the drone 200 according to an event generated in the mobile terminal 100 according to the present invention will be described in more detail. Accidents may occur even when the user does not pay attention to the drone 200 only for a moment. Accordingly, it is necessary to reflect this situation in a process of controlling the drone 200 using the mobile terminal 100 depending on various events which can be generated when the mobile terminal 100 is used in order to improve stability of the drone 200 for which problems are arising. A description will be given of various embodiments of a method of controlling operation of the drone 200 according to various events which may be generated in the mobile terminal 100 with reference to the attached drawings.

In the specification, events may include all situations that can occur in the mobile terminal 100, such as placing a call, receiving a call, sending a text message, receiving a text message, fingerprint input, a battery state, abrupt power on/off, and force-touch input in the mobile terminal 100 for controlling the drone 200. While events are considered to be situations which may occur in the mobile terminal 100, situations which may occur in the drone 200 may also be included in the events. For example, a situation in which the drone 200 determines that control input is needed can be considered one of the events.

A description will be given of an exemplary process of controlling the drone 200 according to an event generate in the mobile terminal 100 for aid in understanding the present invention and convenience of description. Here, the process of controlling the drone 200 may include a process before the drone flies, that is, before the drone takes off and a process after the drone flies, that is, after the drone lands as well as a flight process of the drone.

Although only some of various events will be described as examples, the present invention is not applied to only such some events but is applicable to any event that can be generated in the mobile terminal.

Controlling the drone 200 may include two cases of controlling operation such as flight of the drone 200 and controlling operations of sensors such as a camera sensor included in the drone 200. Control of operation of the drone 200 will be described as an example unless otherwise mentioned. Further, even if a specific event is described in the following, the present invention is applicable to other events or inputs within the scope of the present invention.

A description will be given of a process of controlling operation of the drone using fingerprint recognition data input to the mobile terminal as an event.

Figure 4:
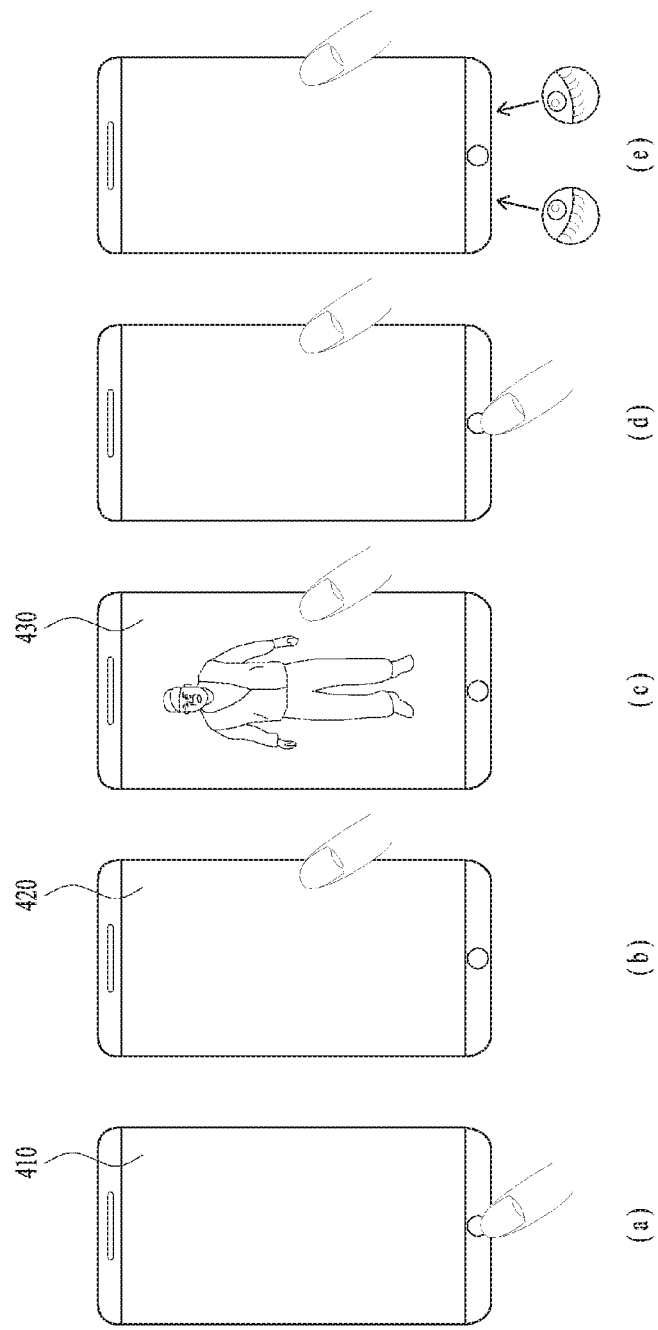
FIG. 4 illustrates a drone control method according to fingerprint/iris recognition data as one of events according to the present invention.

FIG. 4 is a diagram for describing a drone control method according to fingerprint/iris recognition data as an event according to the present invention.

FIGS. 4a to 4d relate to fingerprint data and FIG. 4e relates to iris data.

When the mobile terminal 100 includes a home button 410, fingerprint data can be received through a fingerprint recognition sensor included in the home button 410 as shown in FIG. 4a. Alternatively, fingerprint data may be received through a fingerprint recognition sensor included in the touchscreen 420 of the mobile terminal 100, as shown in FIG. 4b or 4c. Fingerprint data may be received through both the home button 410 and the touchscreen 420 according to situation, as shown in FIG. 4d. The aforementioned fingerprint data reception processes may or may not execute different functions.

FIG. 4b illustrates a case in which fingerprint data is input through the touchscreen 420 on a home screen and FIG. 4c illustrates a case in which fingerprint data is input when a predetermined application is being executed on the touchscreen 420 or image data received from the drone 200 is displayed thereon, for example.

When the fingerprint data is input, the mobile terminal 100 can control the drone 200 on the basis of the input fingerprint data.

When the fingerprint data is received through at least one of methods illustrated in FIGS. 4a to 4d, the mobile terminal 100 identifies a user using the received fingerprint data. The mobile terminal 100 determines whether the identified user has the authority to control operation of the drone 200 or to use the mobile terminal 100.

Figure 9:
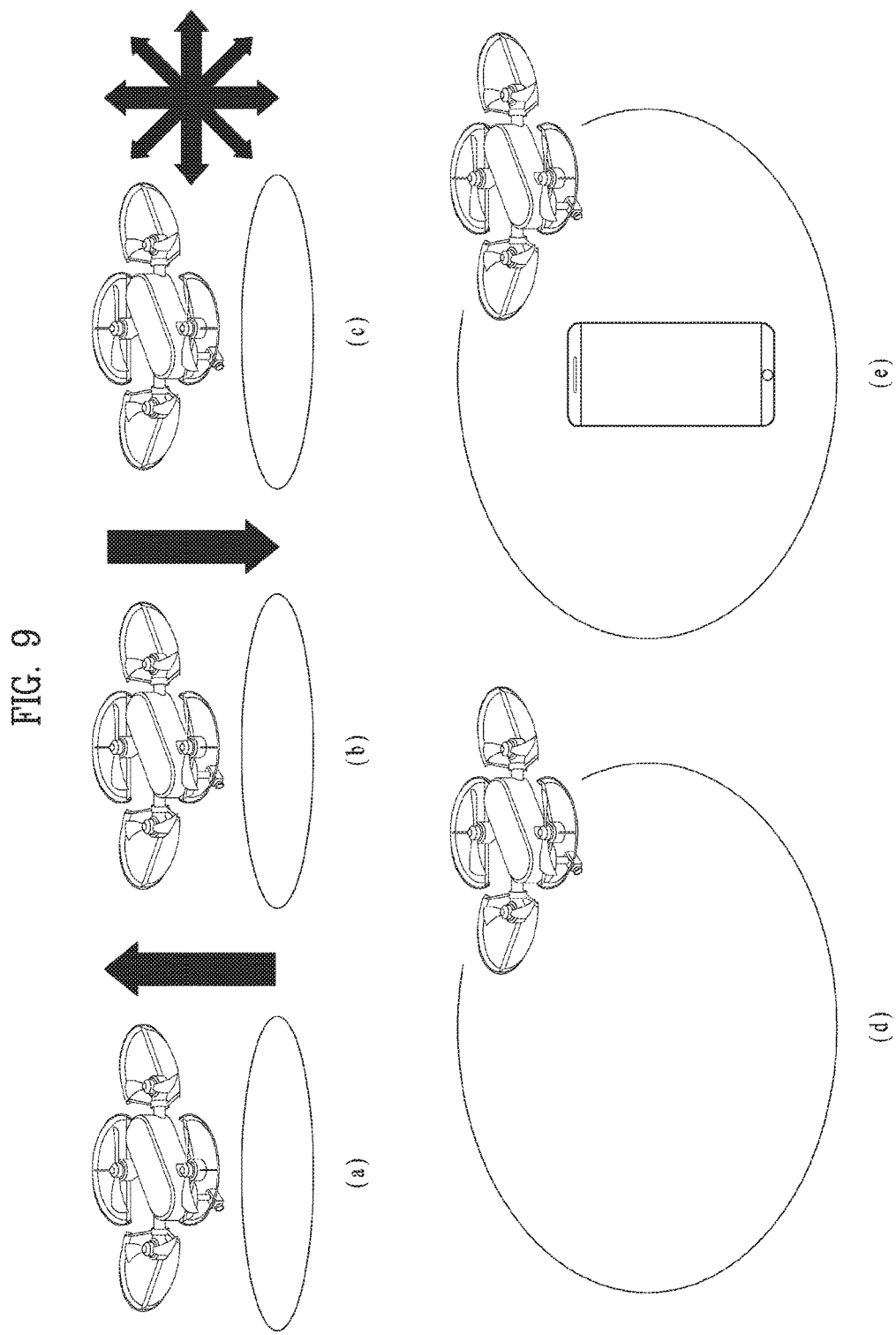
FIG. 9 illustrates basic operations of a drone related to an event according to the present invention.

When the identified user does not have the authority to control operation of the drone 200 or to use the mobile terminal, the mobile terminal 100 can perform the following control. For example, the mobile terminal 100 can change to a lock state such that an application for controlling the drone 200 cannot be executed or the drone control application being executed can be terminated. If the drone 200 is in a state before takeoff, the mobile terminal 100 can output a control signal for preventing takeoff of the drone 200. If the drone 200 has taken off, the mobile terminal 100 may transmit a control signal for controlling the drone 200 to maintain the current position and altitude and to land at the initial takeoff position, the current position or a predetermined position. Alternatively, if the drone 200 has taken off, the mobile terminal 100 may transmit a control signal for controlling the drone 200 to continuously perform circular flight on a specific track on the basis of the current position, as illustrated in FIG. 9d, or to perform circular flight on a specific track on the basis of the mobile terminal 100, as illustrated in FIG. 9e.

On the contrary, when the identified user has the authority to control operation of the drone 200 or to use the mobile terminal 100, the mobile terminal 100 can perform unlocking or automatically execute the drone control application. Alternatively, the mobile terminal 100 may display the UI for drone operation control on the screen independently of unlocking or execution of the drone control application. When unlocking is performed or the drone control application is executed, a UI including menu items for executing specific functions or advanced functions may be provided separately from the originally provided drone operation control UI. Alternatively, when fingerprint data is provided and the user of the fingerprint data has the authority as described above, the mobile terminal may provide preferred functions, flight records, related image data and the like, which were used by the user during previous control of the drone 200, on the screen and perform the next operation selected by the user. Alternatively, when fingerprint data of the user having the authority is provided after the drone 200 takes off, the mobile terminal 100 may control sensing data acquired through a sensor such as at least one camera sensor included in the drone 200 to be received and stored in a memory of the mobile terminal 100 from the time when the fingerprint is provided.

The mobile terminal 100 may perform different processes in a case in which the fingerprint data is input through the home button 410 and a case in which the fingerprint is input through the touchscreen 420.

For example, when the fingerprint data is input through the home button 410 of the mobile terminal, the mobile terminal 100 may use the fingerprint data input for unlocking only and may not provide the UI for operation control of the drone 200 or may not execute a function related to operation control of the drone 200.

When the fingerprint data is input through any region of the touchscreen 420 instead of the home button 410 of the mobile terminal, the mobile terminal may perform a different control operation from the control operation when the fingerprint data is input through the home button 410. For example, the fingerprint data input through the touchscreen 420 can be interpreted as data for controlling the drone 200 not data for determining the authority to use the mobile terminal 100. In this case, the mobile terminal 100 may execute the drone control application and provide the execution screen or provide the UI for drone operation control irrespective of execution of the application upon determining that the user has the authority through the fingerprint data, regardless of the screen state of the display screen.

When the user applies fingerprint data through the display screen of the mobile terminal 100 although the display screen is turned off, a predetermined UI for operation control of the drone 200 may be displayed. Alternatively, operation of the drone 200 may be immediately controlled according to additional input of the user along with the UI for operation control of the drone 200 upon recognition of the fingerprint data. When the display screen of the mobile terminal 100 is turned off as described above, operation control through fingerprint recognition or additional input after fingerprint recognition is performed, for example, for a case in which battery charge of the mobile terminal 100 is lower than a threshold value or the mobile terminal 100, rather than functions of the mobile terminal 100, is preferentially used as an input means for operation control of the drone 200.

Additionally, the mobile terminal may transmit a control signal regarding fingerprint data input to the drone 200 when fingerprint data is received and a user identified through the received fingerprint data is an authorized user. The drone 200 may transmit a feedback signal upon reception of the control signal regarding fingerprint data input from the mobile terminal 100. For example, the control signal can include a control command for start of user's control related to the fingerprint data. The drone 200 may return an ACK signal for contents included in the control signal as the feedback signal. The mobile terminal 100 may receive the returned ACK signal and output at least one of a UI, an audio signal, an image signal and a haptic signal corresponding to the ACK signal to allow the user of the mobile terminal 100 to recognize reception of the ACK signal. Then, the mobile terminal 100 may control the drone 200 by transmitting, to the drone 200, a control signal according to next control input of the user who has input the fingerprint data.

Such fingerprint data may be combined with force-touch data to be used for control of the drone. For example, the mobile terminal 100 can output the UI for operation control of the drone 200 according to force-touch input upon reception of the force-touch input after or along with the fingerprint data input.

For example, the UI may implement position control, altitude control, forward/backward movement and the like according to force-touch input.

When a drag signal is received along with the fingerprint data and force-touch input, the mobile terminal 100 may control the drone 200 to move in a direction corresponding to the received drag signal.

Voice or gesture may be used for operation control of the drone 200 in addition to the drag signal. For example, when a voice control command is input or gesture input using an acceleration sensor is received while force-touch input is applied by the user, the mobile terminal 100 can transmit a control signal for controlling operation of the drone 200 corresponding to the voice control command or the gesture input from among control command items according to the fingerprint data and force-touch. This operation control signal may differ from a control signal when fingerprint data is not received or a voice control command or a gesture input is received when force-touch input is not applied. The mobile terminal 100 may provide different UIs for operation control of the drone 200 in a case in which the fingerprint data is input through the home button and a case in which the fingerprint data is input through the touchscreen constituting the display. For example, when the fingerprint data is input through the home button 410, the mobile terminal 100 transmits a UI or a control signal including control items for basic operation of the drone 200, for example, takeoff and landing of the drone 200. When the fingerprint data is input through the touchscreen 420, the mobile terminal 100 can transmit a UI or a control signal regarding specific operations other than the basic operation of the drone 200. When the basic operation of the drone 200, that is, takeoff/landing is controlled only using the fingerprint data, the mobile terminal 100 can transmit a control signal for controlling takeoff of the drone 200 upon first reception and determination of fingerprint data and then transmit a control signal for controlling landing of the drone 200 upon the next reception and determination of fingerprint data.

The mobile terminal may control operation of the drone 200 only when initial fingerprint data has been input and the user has been determined to have the authority to control the drone 200. In this case, even when the application for operation control of the drone 200 is executed or the user logs in after execution of the application, the user can use the drone through additional authentication with reference to the fingerprint data. Meanwhile, it is possible to guarantee the authority to control operation of the drone 200 through continuous additional authentication or re-authentication after first fingerprint recognition. In this case, when additional authentication or re-authentication fails, the mobile terminal 100 may control the drone to perform at least one of basic operations such as landing at a corresponding position, flying on a track around the mobile terminal 100 and maintaining the current position and altitude if a new authentication procedure is not performed within a predetermined time from the time when the additional authentication or re-authentication fails or authentication fails again after new authentication.

When fingerprint data is input or force-touch input is received after the fingerprint data input, the mobile terminal 100 may broadcast a control signal for identifying whether the detectable drone 200 is present therearound.

Then, the mobile terminal may detect information on the drone 200 from a feedback signal received in response to the broadcast result and use the information for operation control of the drone 200.

Alternatively, the mobile terminal 100 may cancel a manual operation mode of the drone 200 and transmit a UI or a control signal for controlling the drone 200 to operate in an automatic operation mode when fingerprint data is input or force-touch input is received after the fingerprint data is input.

The aforementioned drone operation control through fingerprint recognition can be equally or similarly applied to a case of using iris recognition as shown in FIG. 4e.

An example in which only force-touch is applied as an event will be described. In this case, it is assumed that fingerprint recognition input is not applied, distinguished from the aforementioned example.

FIG. 5a illustrates an example of force-touch and FIG. 5b illustrates an example of drag input after force-touch. FIGS. 8a to 8d show examples of a control message window displayed on the display screen for operation control of the drone 200 when an event is generated in the mobile terminal 100 as illustrated in FIG. 5a or 5b.

FIG. 5a illustrates a case in which first intensity input, second intensity input and third intensity input, that is, force-touch input, are applied to a region of the touchscreen (or home button) of the mobile terminal 100.

Here, the force-touch input may be recognized as only the first intensity input applied to the touchscreen of the mobile terminal 100.

Upon detection of the first intensity input, the mobile terminal 100 recognizes the first intensity input as force-touch input and outputs a first drone operation control signal or provides at least one of the message windows 812, 814, 816 and 818 shown in FIGS. 8a to 8d on the display screen. Here, the provided first message window may be determined according to the current state of the drone, for example. For example, when the drone has not yet taken off when the first intensity input is received, the message window 816 including items related to takeoff, as shown in FIG. 8c, can be selected and provided.

Upon detection of the second intensity input, the mobile terminal 100 recognizes the second intensity input as force-touch input and outputs a second drone operation control signal or provides at least one of the message windows 812, 814, 816 and 818 shown in FIGS. 8a to 8d on the display screen. Here, the provided second message window may be determined according to the current state of the drone. The second drone operation control signal transmitted according to the second intensity input or the second message window determined according to the second intensity input may be identical to or different from the first drone operation control signal or the first message window. For example, if the first drone operation control signal is a drone takeoff control signal, the second drone operation control signal may be a signal for controlling the flying speed of the drone.

Upon detection of the third intensity input, the mobile terminal 100 recognizes the third intensity input as force-touch input and outputs a third drone operation control signal or provides at least one of the message windows 812, 814, 816 and 818 shown in FIGS. 8a to 8d on the display screen. Here, the provided third message window may be determined according to the current state of the drone as described above. Further, the third drone operation control signal transmitted according to the third intensity input or the third message window determined according to the third intensity input may be identical to or different from the first and/or second drone operation control signals or the first and/or second message windows. For example, if the first drone operation control signal is a drone takeoff control signal and the second drone operation control signal is a signal for controlling the flying speed of the drone, as described above, the third drone operation control signal may be a signal for controlling landing of the drone.

In the case of first, second and third intensity inputs shown in FIG. 5a, the mobile terminal can output predetermined control signals to control operation of the drone. In this case, accordingly, the message windows 812, 814, 816 and 818 shown in FIGS. 8a to 8d may not be provided. Referring to FIG. 5b, when at least one of the first, second and third intensity inputs shown in FIG. 5a is applied and then dragged to a predetermined region with force-touch maintained, the mobile terminal may transmit a predetermined fourth operation control signal, which is different from the operation control signals in the case of FIG. 5a, or provide at least one of the message windows shown in FIGS. 8a to 8d. In this case, the mobile terminal may control operation of the drone depending on a drag direction after the force-touch, a distance between the force-touch point and a drag release point, that is, a drop point, or a time taken to release drag from the force-touch. In the case of FIG. 5b, message windows or control signals may also be determined on the basis of the current state of the drone.

Figure 6:
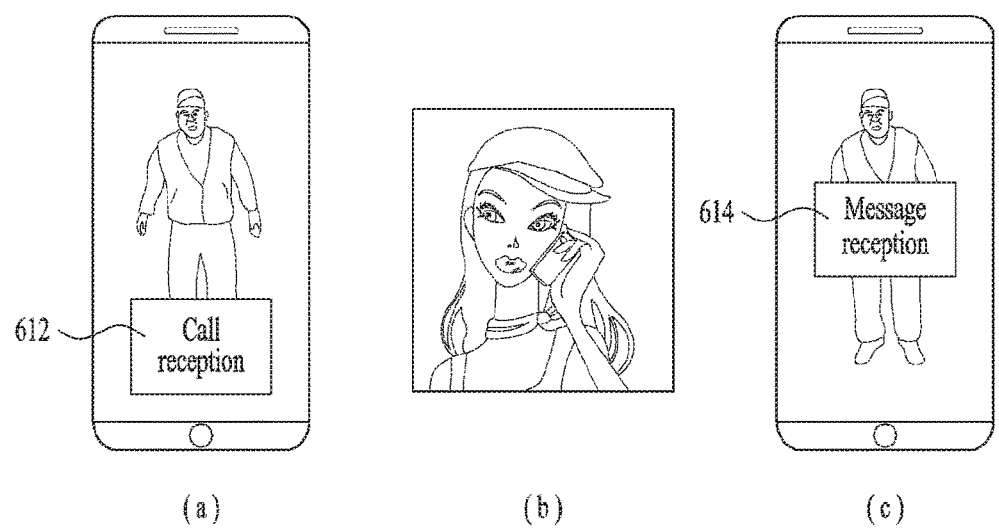
FIG. 6 illustrates a drone control method when an application such as call/text is executed as one of events according to the present invention.

FIG. 6 illustrates a method of controlling a drone when a call/text application is executed as an event according to the present invention and FIG. 7 illustrates a method of controlling operation of a drone according to an event or gesture input associated with the event according to the present invention.

A case in which a text message is transmitted or received or a telephone call is sent or received as an event that can be generated in the mobile terminal 100 will be described by way of example. In other words, operation control of the drone 200 when an application for a text message or SNS service or a call application is executed during control of the drone 200 through a mobile terminal will be described.

In this case, upon execution of at least one of the aforementioned applications, the mobile terminal 100 may transmit a control signal for operation control of the drone 200 or provide at least one of message windows as shown in FIGS. 8a to 8d with reference to at least one of voice data input and gesture input of the user of the mobile terminal 100 and sensing input through a sensor of the mobile terminal 100.

Here, the mobile terminal 100 can analyze at least one of the aforementioned inputs and transmit an operation control signal corresponding to the analyzed input or provide a message window corresponding thereto in consideration of the current state of the drone 200 as well as the at least one of the inputs.

The control signal may include a control command for at least one of lowering altitude, takeoff, landing, gaining altitude, execution of around-view, fixing position, fixing altitude, moving to a target and taking a selfie.

The mobile terminal may automatically provide a speakerphone mode instead of a normal call mode when the call application is executed during a drone operation control process or execution of a drone operation control application. When earphones or headphones are connected to the mobile terminal 100, the mobile terminal can automatically provide the speakerphone mode as described above. When another communication device is connected to the mobile terminal 100, data of the call application may be directly delivered to the connected communication device and data for operation control of the drone 200 may be provided on the screen of the mobile terminal 100. In this case, accordingly, menus or screens for operation control of the drone 200 can be continuously used in the same manner before execution of the call application through the mobile terminal in the activated speakerphone mode. However, when the user releases the speakerphone mode, a control signal for controlling the drone 200 to perform at least one of the operations shown in FIGS. 9a to 9e can be transmitted to the drone 200, as described above.

Meanwhile, when the user is speaking on the mobile terminal 100 for telephone conversation while holding the mobile terminal 100 to his/her ear, the mobile terminal 100 transmits a control signal for controlling the drone 200 to perform at least one of the operations shown in FIGS. 9a to 9e as described above with the exception of a special case. When a value sensed through a proximity sensor of the mobile terminal 100 indicates that the mobile terminal 100 is separated from the user's ear even when the mobile terminal 100 is being used for telephone conversation, the display screen is turned on. When the display is turned on, the mobile terminal 100 can provide a UI for operation control of the drone 200 as shown in FIGS. 8a to 8d or automatically transmit a control signal for controlling the drone 200 to perform at least one of the operations shown in FIGS. 9a to 9e. In the latter case, when there is a previously transmitted control signal, the mobile terminal 100 may transmit the same control signal or a control signal different from the control signal on the basis of the previously transmitted control signal and the value sensed through the proximity sensor.

When there is an incoming call, the mobile terminal 100 may provide a UI 612 through which reception of a call can be identified on the display screen, as shown in FIG. 6a. In this case, when the user selects the UI 612, the call application is executed. The user can use a call service as shown in FIG. 6b.

When a text message or an SNS message is received, similarly to FIG. 6a, a UI 614 through which the user can recognize whether a message is received, contents of a message and the like may be provided on the screen, as shown in FIG. 6c. In this case, the mobile terminal 100 may allow the user to check the message or provide a keyboard or the like used to generate a message in response to the checked message on the screen in an overlay manner when the UI 614 is selected. Alternatively, the mobile terminal 100 may provide a related application execution screen as a reduced screen. In the case of a text message, operation related thereto is performed for a short time in general, differently from the call application. Accordingly, a control signal for controlling the drone 200 to maintain the current position and altitude while an operation for generating the reply message is performed may be transmitted to the drone.

When the call application is executed, the mobile terminal 100 automatically transmits the first drone operation control signal to control the drone to perform at least one of the operations shown in FIGS. 9a to 9e. Here, when the time for which the call application is used or the method of using the call application is not changed within a predetermined time, the mobile terminal 100 may provide a feedback signal such as a haptic effect to the user or transmit the second drone operation control signal to the drone 200 such that the drone 200 lands at the current position, the initial takeoff position or a predetermined landing position. When a signal according to an event such as detection of an obstacle or landing position error is received from the drone 200 after execution of the call application, the mobile terminal 100 can provide a haptic effect or transmit a new drone operation control signal as described above.

In addition, when the camera function of the mobile terminal is executed during control of operation of the drone through the mobile terminal 100, the following operation can be performed.

Upon execution of the camera application, the mobile terminal 100 may transmit a control signal to the drone 200 to control the drone 200 to send data such as a currently or previously captured image and provide image data of the drone received in response to the control signal on the screen.

In addition, the mobile terminal 100 may control only the camera of the drone 200 while the drone 200 maintains the current position and altitude when the camera application is executed. In this case, when the drone 200 includes a plurality of cameras, the mobile terminal 100 may provide a UI through which a desired camera can be selected or transmit a control signal for simultaneously controlling resolution, angles and zoom-in/zoom-out of all cameras or controlling at least one camera to be activated.

In this case, the mobile terminal 100 can output the image data received from the drone 200 on the display and control the angle of the drone or at least one camera included in the drone to be changed upon selection of the displayed image data.

Furthermore, the mobile terminal 100 may transmit a control signal for controlling the drone 200 or a camera to the drone 200 according to a voice or at least one of gestures shown in FIGS. 7a to 7f, which are input thereto after display of the image data. FIG. 7a represents at least one of lowering the altitude of the drone, landing and decreasing the angle of a drone camera, FIG. 7b represents at least one of gaining altitude of the drone, takeoff and decreasing the angle of the drone camera, FIG. 7c represents at least one of fixing the position of the drone, maintaining the altitude of the drone and fixing the angle of the drone camera, FIG. 7d represents at least one of moving the position of the drone, changing the angle of the drone camera and changing a capture target, FIG. 7e represents at least one of rotating the drone 200 at the current position, rotating on a predetermined track and taking a picture of around-view using a camera of the drone 200, and FIG. 7f represents at least one of returning the drone 200 to the position of the mobile terminal and taking a selfie using the camera of the drone 200. The gestures shown in FIG. 7 and functions mapped thereto may be defined differently and various operations through new functions may be defined according to other gestures which are not shown.

The aforementioned data of the drone 200 may be provided through a drone operation control menu and a divided screen or the overall screen because drone operation control is being performed. When the drone data is displayed over the entire screen, an operation control signal according to drag or drag-drop may be generated and transmitted to the drone 200.

Next, control of operation of the drone 200 when the battery or power of the mobile terminal 100 is suddenly turned off will be described.

The mobile terminal 100 may perform the following operation when battery charge is lower than a threshold value.

When battery charge is lower than the threshold value, the mobile terminal 100 may not properly control operation of the drone 200. Accordingly, the mobile terminal 100 may provide an operation control UI for appropriately controlling the drone 200.

Alternatively, the mobile terminal 100 may transmit a control signal to the drone 200 to control the drone 200 to perform a predefined operation when battery charge is lower than the threshold value. Here, the mobile terminal 100 may subdivide the threshold value, primarily notify the user of insufficient battery charge and battery charging if battery charge is 10%, and automatically transmit the control signal for performing the predefined operation and notify the user of battery charging if battery charge decreases below 5%, for example.

The UI or the predefined operation includes at least one of returning to the current position of the mobile terminal 100, returning to the initial takeoff place, landing at a predetermined landing place, landing at the current position, and maintaining the current position and altitude.

The mobile terminal 100 may periodically transmit position information on the position of the mobile terminal 100 to the drone 200 until power is off when battery charge decreases below the threshold value in order to induce and control the drone 200 to return to a position closest to the mobile terminal 100 even when the mobile terminal 100 is suddenly turned off.

When battery charge is lower than the threshold value as described above, the mobile terminal 100 may broadcast a signal for detecting presence of another mobile terminal for drone control around the drone 200 or the mobile terminal 100. The subject of drone operation control can be changed according to the broadcast detection signal when battery charge decreases below the threshold value. In this case, however, the subject can be changed only when the detected mobile terminal is a device previously registered with the drone 200 or the mobile terminal 100 or authorized to control the drone. Whether the detected mobile terminal is a device previously registered with the drone 200 or the mobile terminal 100 or authorized to control the drone may be determined through various methods using fingerprint recognition data, predefined gesture, voice recognition and iris recognition.

In addition, when the drone 200 does not receive a control signal from the mobile terminal 100 for a predetermined time or is abruptly disconnected from the mobile terminal 100, the drone 200 may maintain the current position and altitude for a predetermined time and land at the initial takeoff position, the current position or a predetermined landing position. This operation can be performed without a control signal of the mobile terminal 100 for controlling the drone 200. Additionally, the drone may continuously broadcast position data about the position thereof after takeoff such that the user of the mobile terminal 100 can detect the position data to recognize the position of the drone.

The above description is applicable to a case in which the drone 200, not the mobile terminal 100, is suddenly turned off due to the battery thereof or for other reasons.

The mobile terminal 100 may control a landing process of the drone 200 more precisely. For example, when the mobile terminal 100 transmits a landing control signal as a drone operation control signal, the drone 200 may return image data obtained by capturing an estimated landing position and the area therearound in response to the landing control signal, similarly to the aforementioned case of handling an obstacle. The drone 200 may determine whether the estimated landing position is appropriate through the captured image data when no control signal is received from the mobile terminal 100 after transmission of the landing control signal within a predetermined time after returning of the image data, for example, an estimated time from the current time to an estimated landing time. When the corresponding position is determined to be an inappropriate position, the drone 200 maintains the current position and altitude, returns an inappropriate landing signal to the mobile terminal 100 and waits for a signal in response thereto. Upon reception of the signal from the mobile terminal, the drone can operate in response to the signal.

Further, the drone 200 may periodically transmit a signal representing the current position thereof when the landing position is not within a predetermined distance from the mobile terminal 100.

In addition, when the aforementioned event is generated in the drone control process, the mobile terminal 100 may provide the drone control UI on a region of the display screen when an application related to the generated event is executed in the foreground or the application execution screen is provided thereon or execute the drone control application in the background and transmit a related control signal.

Upon determining that the event is finished, the mobile terminal 100 may automatically provide the execution screen of the previously executed drone operation control application or a related message window on the screen.

As described above, the mobile terminal 100 can continuously provide the drone operation control application execution screen on a divided display screen when the event is generated.

A description will be given of various embodiments for drone operation control upon generation of an event in the mobile terminal 100 or drone operation control through the mobile terminal 100 irrespective of the event.

Figure 10:
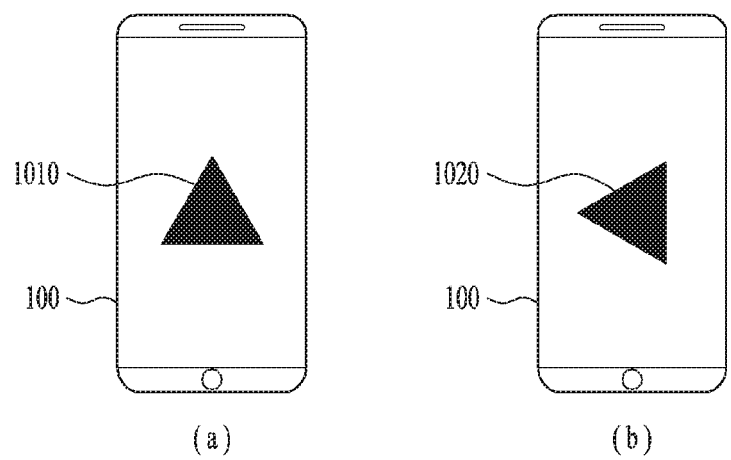
FIG. 10 illustrates a method of displaying a drone direction according to an embodiment of the present invention.

FIG. 10 illustrates a method of displaying a heading of the drone 200 according to an embodiment of the present invention.

FIG. 10a illustrates the mobile terminal 100 and the drone 200. The mobile terminal 100 may include a display (e.g., a touchscreen). The front of the drone 200, that is, a direction in which a camera is located, may be called the heading or heading direction of the drone 200. The drone 200 may include a sensing unit to sense position information. The drone 200 may transmit sensed position information to the mobile terminal 100. The mobile terminal 100 may detect the heading of the drone 200 on the basis of the sensed position information. The mobile terminal 100 may display the detected heading of the drone 200 on the display. That is, the user can determine the direction of the drone 200 using the heading of the drone 200 displayed on the display.

FIG. 10b illustrates the drone 200 having a changed heading and the mobile terminal 100. The direction and position of the drone 200 may be changed according to control of the mobile terminal 100. Referring to FIG. 10b, the drone 200 has rotated to the left by 90 degrees compared to FIG. 10a. The mobile terminal 100 may display the heading of the rotated drone 200 on the display on the basis of position information received from the drone 200.

The user can check the heading of the drone 200 displayed on the display and control the drone 200.

However, the heading of the drone 200 may not correspond to a direction in which the drone 200 moves from the mobile terminal 100, differently from the above description.

Figure 11:
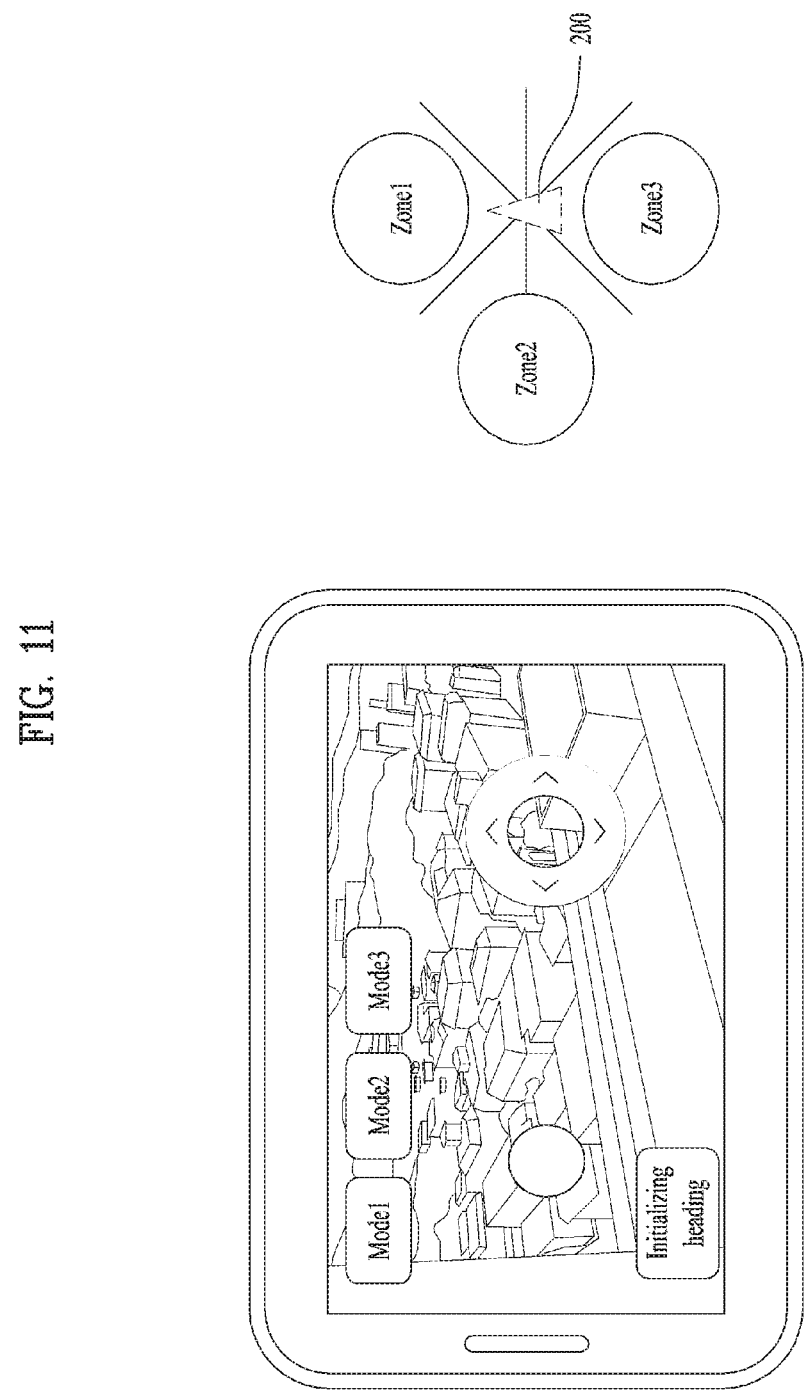
FIG. 11 illustrates a method of sensing a heading of a drone according to an embodiment of the present invention.

FIG. 11 illustrates a method of sensing the heading of the drone 200 according to an embodiment of the present invention.

The mobile terminal 100 may display modes regarding the direction of the drone 200 and the heading of the drone 200. The mobile terminal 100 may display a heading of the drone 200 according to a predetermined zone and the predetermined zone. Further, the mobile terminal 100 may include a button for initializing the heading of the drone 200. The mobile terminal 100 may have a plurality of modes for detecting the direction of the drone 200.

The mobile terminal 100 may receive position information from the drone 200 and detect the heading of the drone 200. The mobile terminal 100 may display the heading of the drone 200 on the basis of the direction of the drone 200. When the direction of the drone 200 is changed to another zone, the mobile terminal 100 may output an alarm. In an embodiment, when the heading of the drone 200 is changed from a first zone to a second zone, the mobile terminal 100 may output vibration twice and display the second zone in a flashing manner. When the heading of the drone 200 is changed from the second zone to a third zone, the mobile terminal 100 outputs vibration three times and displays the third zone in a flashing manner.

FIG. 12 illustrates a method of controlling the drone according to the heading of the drone 200 according to an embodiment of the present invention.

FIG. 12a shows the drone 200, a user and the screen of the mobile terminal 100. FIG. 12a illustrates initial states of the drone 200 and the user. That is, the direction of the drone 200 corresponds to the direction of the user/mobile terminal 100 and the heading of the drone 200 corresponds to the first zone.

FIG. 12b illustrates the drone 200 in a changed direction. The user is facing in the same direction as FIG. 12a. However, the direction of the drone 200 has been changed to the second zone according to user operation.

The mobile terminal 100 may compare direction information of the drone 200 with direction information of the mobile terminal 100 to detect a relative direction. The mobile terminal 100 may correct a difference between the direction of the drone 200 and the direction of the mobile terminal 100 and operate the drone 200. For example, if the user is headed in a direction of 0 degrees and the drone 200 is headed in a direction of −90 degrees, the mobile terminal 100 can determine that the drone 200 has rotated by −90 degrees on the basis of the user. If the user inputs a command for moving the drone in the previous direction (i.e., direction of 0 degrees), the user's intention may be considered to move the drone 200 in the direction of 0 degrees. However, the drone 200 may move in the previous direction (i.e., direction of −90 degrees) in the current state. Accordingly, the mobile terminal 100 can correct a direction value and transmit a movement command to the drone 200. That is, when the user inputs the command for moving the drone in the previous direction (i.e., direction of 0 degrees), the mobile terminal 100 can correct the direction value by +90 degrees and transmit, to the drone 200, a command for moving the drone to move in the direction of 0 degrees. That is, the mobile terminal 100 can detect the heading of the drone 200 on the basis of received sensing data and detect the heading of the mobile terminal 100. The mobile terminal 100 can calculate a difference between the heading of the drone 200 and the heading of the mobile terminal 100, correct a direction input through the input unit by the calculated difference and transmit a command.

The drone 200 may align with the direction of the mobile terminal 100 (i.e., the direction of the user) in response to a heading initialization command. This operation can be performed in real time.

Figure 13:
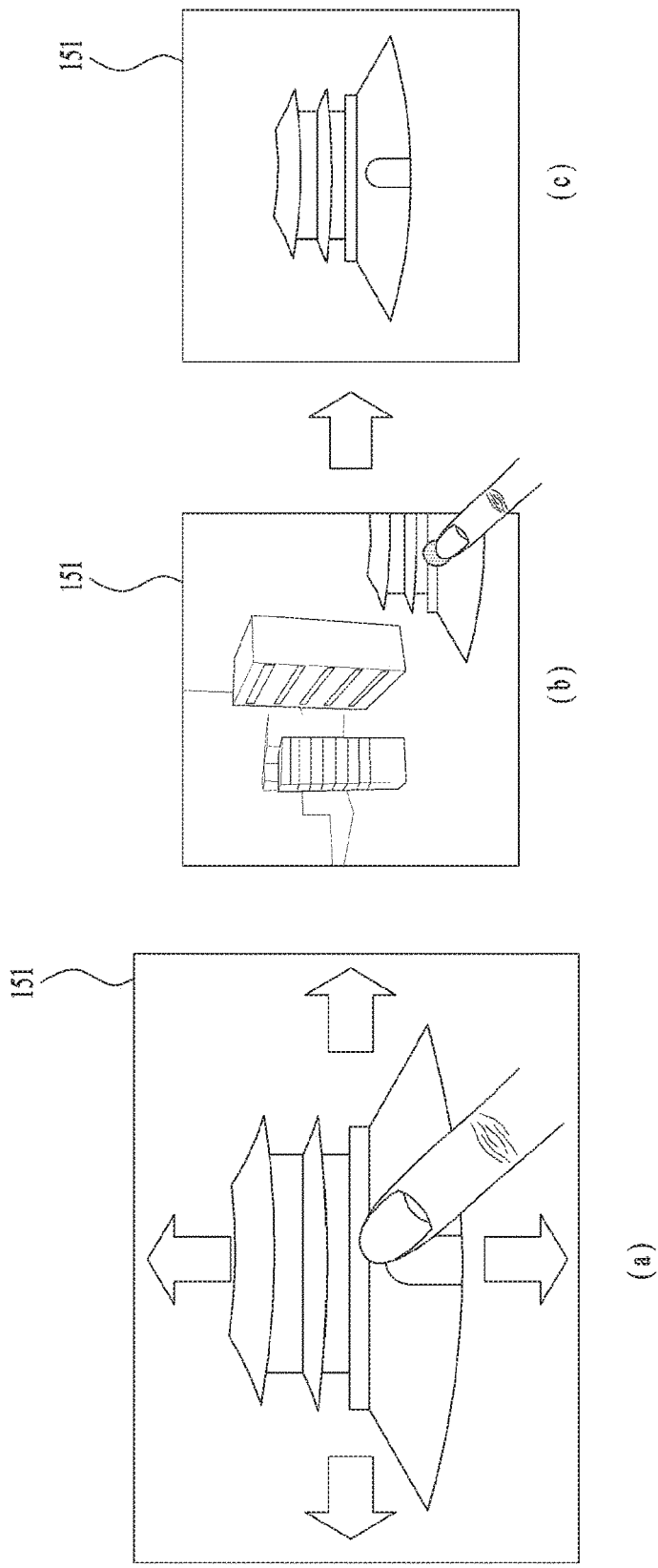
FIG. 13 illustrates a method of controlling a camera included in a drone using a mobile terminal according to an embodiment of the present invention.

FIG. 13 illustrates a method of controlling a camera included in the drone 200 using the mobile terminal 100 according to an embodiment of the present invention.

FIG. 13a shows the display 151 of the mobile terminal 100.

The camera of the drone 200 can capture images. The drone 200 may transmit captured image data to the mobile terminal 100. The mobile terminal 100 may display the transmitted image data on the display 151. Here, the image data may include sound such as a voice in addition to images, and the sound may be output through the audio output unit 152 included in the output unit among the components of the mobile terminal 100 shown in FIG. 1a.

The display 151 may receive touch input. For example, the display 151 can receive swipe input in the upward direction. Swipe input refers to input touching a point of the display and moving the touch in one direction while maintaining touch. For example, swipe input may include input such as drag and flicking. When the display 151 receives swiping input applied upward in an embodiment, the camera of the drone 200 can move downward. When the camera of the drone 200 moves downward, the image scrolled upward from the displayed image can be displayed on the display 151. When the display 151 receives swiping input applied to the right, the camera of the drone 200 can move to the left. When the camera of the drone 200 moves to the left, the image to the right of the displayed image can be displayed on the display 151.

Further, the display 151 may receive pinch-out input for extending the screen. The camera of the drone 200 may perform a zoom-in operation corresponding to an input gesture. Similarly, the display 151 may receive pinch-in input for reducing the screen. The camera of the drone 200 may perform a zoom-out operation in response to the pinch-in input.

As described above, the mobile terminal 100 can control the camera of the drone 200 on the basis of touch input applied to the display 151. However, touch input applied through the display 151 and operation control of the camera of the drone 200 are not limited to the aforementioned description and operations opposite to or different from the aforementioned description may be performed.

FIG. 13b shows the display 151 of the mobile terminal 100 which displays received image data. As described above, the camera of the drone 200 can capture an image. The drone 200 can transmit captured image data to the mobile terminal 100. The display 151 of the mobile terminal 100 can display the received image data. The user can touch a region of the display 151.

FIG. 13c shows the display 151 having a changed displayed image region. The display 151 may receive touch input. The mobile terminal 100 may transmit information regarding a touched region to the drone 200. In an embodiment, the mobile terminal 100 may store information on relative coordinates of the displayed image. In addition, the mobile terminal 100 may acquire information on the coordinates of the touched region. The mobile terminal 100 may transmit information for correcting the acquired coordinate information into central coordinate information. The drone 200 may control the camera such that the coordinates acquired by the mobile terminal 100 correspond to the center point of the image captured by the camera. Accordingly, the display 151 can display an image having the touched region which has been moved to the center point. That is, the mobile terminal 100 can move displayed image data by controlling the camera such that a touch point on the screen corresponds to the center point of the screen.

Additionally, it is possible to move the position of the drone 200 instead of controlling camera operation of the drone 200 according to touch input shown in FIG. 13. In other words, it is possible to control the drone 200 to be located at a position corresponding to a touch point on the display 151 or to control motion of the drone 200 according to swipe, pinch-in or pinch-out input.

Figure 14:
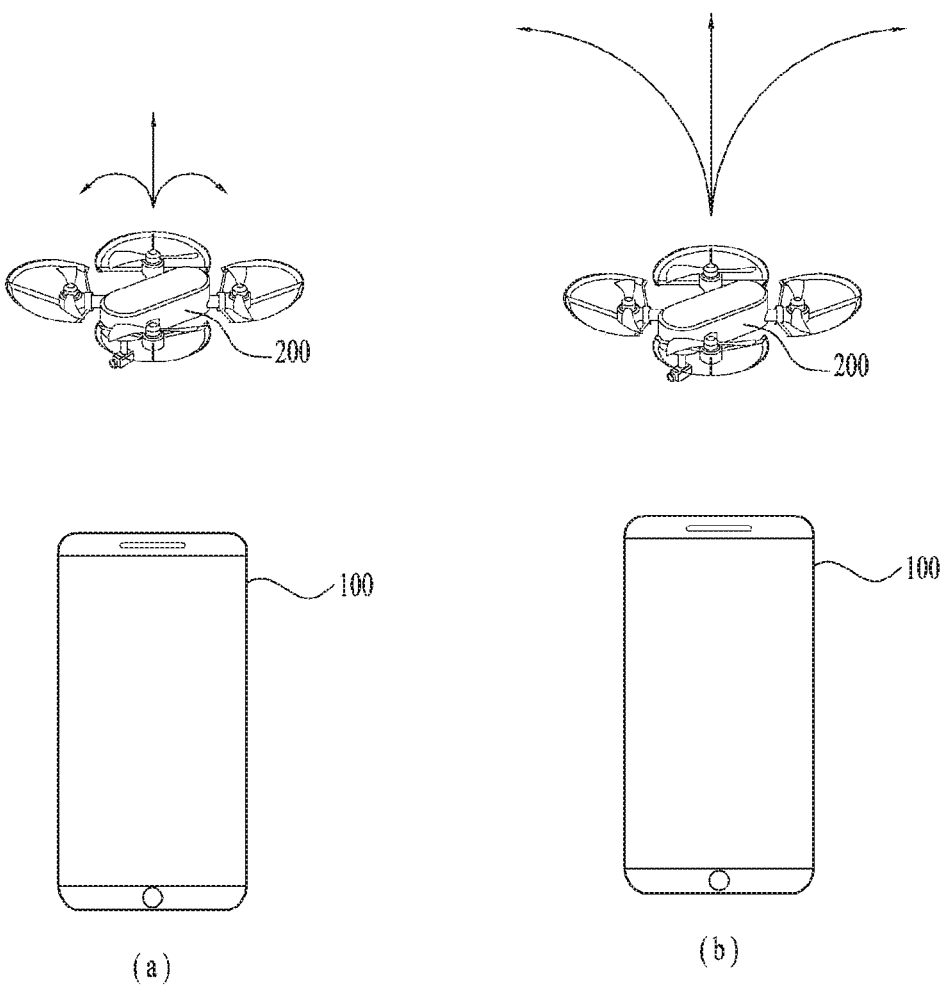
FIG. 14 illustrates a method of controlling a drone depending on the speed of the drone according to an embodiment of the present invention.

FIG. 14 illustrates a method of controlling the drone 200 according to the speed of the drone 200 according to an embodiment of the present invention.

FIG. 14 illustrates control of the speed of the drone 200 through the mobile terminal 100. Various methods through the mobile terminal 100 can be used for speed control of the drone 200. A force-touch method is used as an exemplary method in the following for convenience. In this case, the mobile terminal 100 may include components necessary to recognize force-touch and transmit a control command for controlling the speed of the drone 200 according to the recognized force-touch, for example.

First of all, it is assumed that the drone 200 moves at a specific speed (e.g., a regulated speed) as long as a speed control command using force-touch is not transmitted thereto through the mobile terminal 100. Here, the user may control the speed of the drone 200 which moves at the specific speed or stops through force-touch input applied to the touchscreen of the mobile terminal 100. FIG. 14a illustrates low-speed movement of the drone 200 and FIG. 14b illustrates high-speed movement of the drone 200.

When the drone 200 moves at a specific speed, the mobile terminal 100 recognizes first force-touch input applied thereto and determines which one of low-speed, regulated speed and high-speed movement commands corresponds to the first force-touch input upon reception of the first force-touch input. Then, the mobile terminal 100 transmits the low-speed movement command to the drone 200 upon determining that the first force-touch input corresponds to the low-speed movement control command. Here, the low-speed movement command may be a command for controlling the drone to move at a speed lower than the current speed or controlling the drone to move at a predetermined speed corresponding to the low-speed movement command irrespective of the current speed. For example, when the current speed of the drone 200 is 50 km/h, the low-speed movement command may be a command for controlling the current speed to decrease to 40 km/h, 30 km/h or the like. If 20 km/h has been preset as a low speed, the drone 200 can move at 20 km/h according to the low-speed movement command even if the drone 200 currently moves at 100 km/h or 50 km/h.

The drone 200 may maintain the current speed or return to the previous speed from the speed changed according to the first force-touch upon release of the first touch-touch applied to the mobile terminal 100.

Further, when the moving speed of the drone 200 is changed according to force-touch, the mobile terminal 100 may provide a haptic effect corresponding thereto such that the user can conveniently control operation of the drone 200.

The aforementioned force-touch may be used not only for speed control of the drone 200 but also for control of drone heading and the camera of the drone 200 or may be used for a plurality of control commands along with other control commands.

Figure 15:
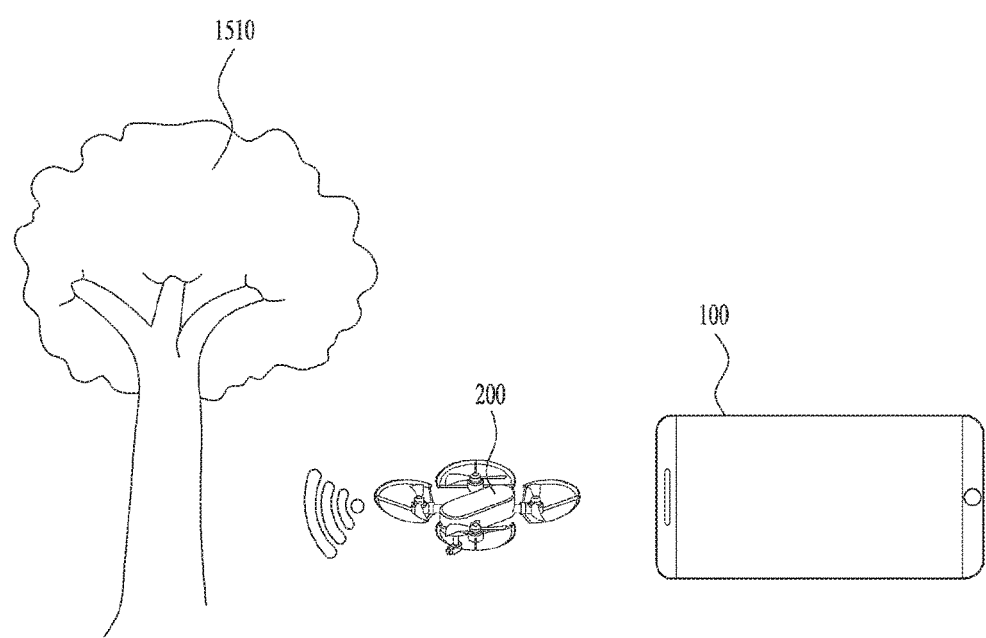
FIG. 15 illustrates a method of controlling a drone upon recognition of an obstacle according to an embodiment of the present invention.

FIG. 15 illustrates a method of controlling the drone 200 upon recognition of an obstacle according to an embodiment of the present invention.

In control of the drone 200 using the mobile terminal 100, the user may not rapidly or sufficiently recognize surroundings of the drone 200. Otherwise, the user may not cope with surroundings of the drone 200 even if he/she recognizes the same. For example, when an obstacle 1510 is present in front of the drone 200 but the user does not recognize the obstacle 1510 or the user cannot appropriately control the drone 200 although he/she recognizes the obstacle 1510, the drone 200 may collide with the obstacle 1510.

When the drone 200 collides with the obstacle 1510, the drone 200 cannot be controlled or other problems may be generated. Accordingly, such problems need to be solved. To this end, the mobile terminal 100 may output a predetermined signal such that the user can conveniently perform appropriate handling upon reception of a signal regarding presence of the obstacle 1510 from the drone 200. For example, the predetermined signal may be a signal regarding haptic effects such as vibration, alarm sound or the like. The drone 200 can take a picture of the obstacle 1510 using the camera. The drone 200 can transmit captured image data to the mobile terminal 100. The mobile terminal 100 can detect the obstacle 1510 and calculate a distance between the obstacle 1510 and the drone 200 on the basis of the data received from the drone 200. Alternatively, the drone 200 may detect the obstacle 1510 and transmit information on the detected obstacle to the mobile terminal 100 or calculate a distance to the obstacle 1510 and transmit the calculated distance to the mobile terminal 100. Alternatively, the drone 200 may sense the obstacle 1510 using a sensing unit. The sensing unit may include an infrared sensor, an ultrasonic sensor and the like. The drone 200 may transmit, to the mobile terminal 100, at least one of sensed information, information obtained by determining presence or absence of the obstacle 1510, and information obtained by calculating the distance between the drone 200 and the obstacle 1510.

The mobile terminal 100 may output a predetermined signal on the basis of the distance between the drone 200 and the obstacle 1510. For example, the mobile terminal 100 can output a haptic effect (e.g., a vibration signal) through a haptic module (e.g., a vibration motor) included therein when the distance between the drone 200 and the obstacle 1510 is equal to or shorter than a predetermined distance. Further, the mobile terminal 100 may control the intensity of the vibration signal (e.g., increase vibration intensity) to vary as the distance between the drone 200 and the obstacle 1510 decreases, that is, as the drone 200 approaches the obstacle 1510. That is, the mobile terminal 100 can output haptic effects depending on presence or absence of the obstacle 1510, the distance between the obstacle 1510 and the drone 200 or the like.

When the drone 200 is approaching the obstacle 1510, the mobile terminal 100 can output haptic effects such that the user recognizes that the drone 200 is approaching the obstacle 1510. Approaching the obstacle 1510 may mean a case in which the distance between the drone 200 and the obstacle 1510 is equal to or shorter than a predetermined distance and the drone 200 moves toward the obstacle 1510.

Further, the mobile terminal 100 may control a speed ratio of the drone 200 according to input. For example, the mobile terminal 100 may control the speed of the drone 200 in response to a displacement input through the input unit in a normal case. In an embodiment, when a displacement applied to the input unit corresponds to 1 cm, the mobile terminal 100 can set the speed of the drone 200 to 1 m/s. When a displacement applied to the input unit corresponds to 3 cm, the mobile terminal 100 can set the speed of the drone 200 to 3 m/s. When the obstacle 1510 is present, the mobile terminal 100 may control a rate of the speed of the drone 200. Further, the mobile terminal 100 may control the speed of the drone 200 differently in a case in which the distance between the drone 200 and the obstacle 1510 is equal to or shorter than a predetermined distance and other cases even when the obstacle 1510 is present. In an embodiment, when the distance between the drone 200 and the obstacle 1510 is equal to or shorter than a predetermined distance, the mobile terminal 100 may set the speed of the drone 200 to 0.1 m/s even if a displacement applied to the input unit corresponds to 1 cm and set the speed of the drone 200 to 0.3 m/s even if a displacement applied to the input unit corresponds to 3 cm. Alternatively, the mobile terminal 100 may adjust the speed of the drone 200 to 0.5 m/s, 0.4 m/s and 0.3 m/s when a displacement applied to the input unit corresponds to 1 cm as the distance between the drone 200 and the obstacle 1510 decreases to 5 m, 4 m and 3 m. Control of the speed of the drone 200 according to input applied to the mobile terminal 100 may be performed through force-input described with reference to FIG. 5. While only speed control such as high-speed control and low-speed control according to force-touch has been described in FIG. 5, the speed of the drone 200 may be controlled more precisely such that the speed changes according to a degree of force-touch as described above.

Accordingly, in control of the drone 200 through the mobile terminal 100, it is possible to reduce difficulty in control of the drone or possibility that the drone collides with the obstacle 1510 and to improve user controllability. The aforementioned description is applicable to a case in which a plurality of obstacles is present.

Figure 16:
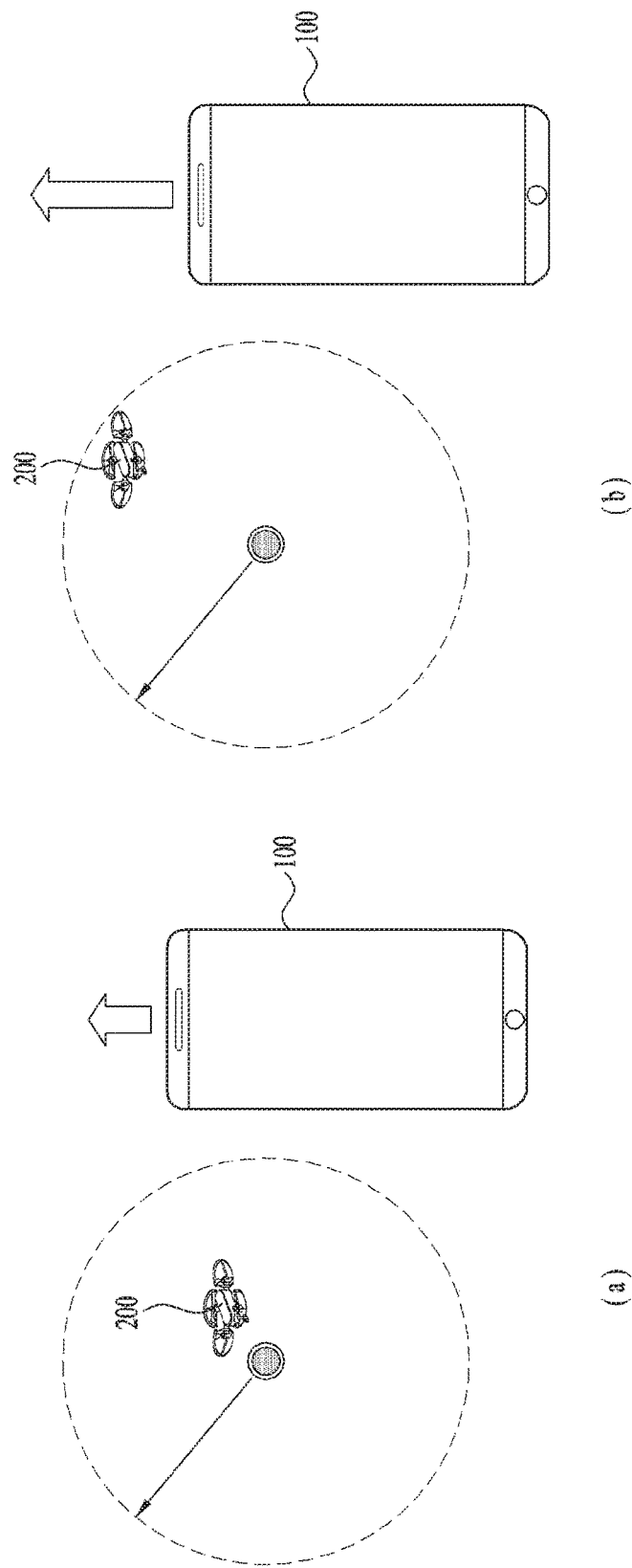
FIG. 16 illustrates a method of controlling a drone depending on communication coverage according to an embodiment of the present invention.

FIG. 16 illustrates a method of controlling the drone 200 depending on a communication coverage.

FIG. 16a shows the drone 200 which moves within a predetermined range from the mobile terminal 100. The mobile terminal 100 can receive position data from the drone 200. The mobile terminal 100 can calculate the distance between the mobile terminal 100 and the drone 200 on the basis of the received position data of the drone 200. For example, the position data may be GPS data of the drone 200. Alternatively, the mobile terminal 100 may communicate with the drone 200 and calculate a distance from the drone 200 on the basis of a time taken to transmit/receive a signal.

The mobile terminal 100 may control the drone 200 to move only within a predetermined distance or range. This may be determined according to a communication scheme used for communication with the drone 200. If the mobile terminal 100 communicates with the drone 200 using Wi-Fi and the coverage of Wi-Fi is 50 m, the predetermined distance or range can be regarded as 50 m. Alternatively, the mobile terminal 100 may set the predetermined distance or range to 45 m or 55 m in consideration of a coverage margin. The predetermined distance or range is based on the position of the mobile terminal 100 and may be varied when the position of the mobile terminal 100 is changed.

When the drone 200 is located within the predetermined range, the mobile terminal 100 can control the drone 200 according to a normal method.

FIG. 16b shows the drone 200 moving around the boundary of the predetermined range. As described above, the mobile terminal 100 can calculate a distance to the drone 200. Accordingly, the mobile terminal 100 may output a control signal for controlling the drone 200 to decrease the speed and not to move to the outside of the boundary of the range upon determining that the drone 200 is located within the predetermined range but moving around the boundary of the range. Upon determining that the drone 200 is located outside the range, the mobile terminal 100 may output a control signal different from the aforementioned control signal. When the drone 200 is located outside the coverage of the mobile terminal 100, even if the mobile terminal 100 transmits a control signal to the drone 200 according to the same communication protocol as the previous communication protocol, the drone 200 cannot receive the control signal. Accordingly, the mobile terminal 100 can transmit a control signal according to a communication protocol different from the aforementioned communication protocol, for example, a communication protocol providing wider coverage. Here, the control signal may include a command for controlling the drone to move within the coverage predetermined according to the previous communication protocol. In the latter case, if the drone 200 receives no signal from the mobile terminal 100 within a predetermined time even if the mobile terminal 100 does not transmit an additional control signal, the drone 200 may be controlled to move to the initial takeoff position, a predetermined landing position or the last position at which the drone communicates with the mobile terminal 100.

Accordingly, when the drone 200 is located around the boundary of the range, a displacement applied to the input unit needs to increase in order to move the drone 200 at the same speed as the speed when the drone 200 is located within the range.

Figure 17:
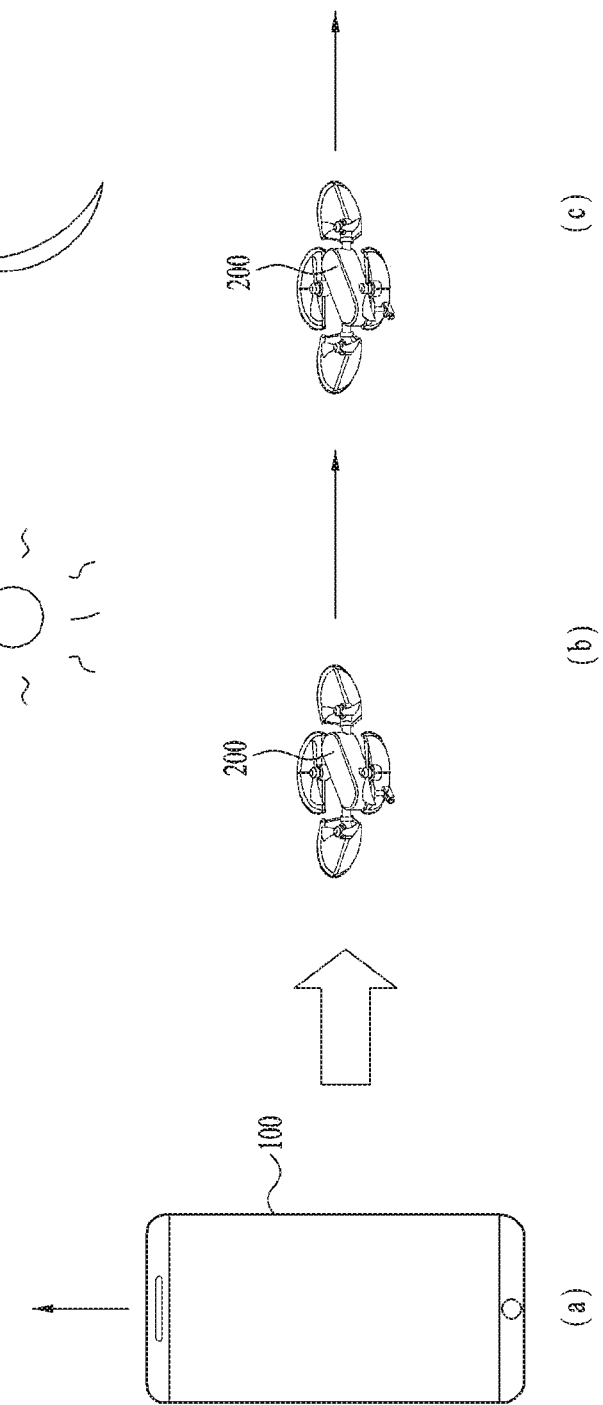
FIG. 17 illustrates a method of controlling a drone depending on illumination according to an embodiment of the present invention.

FIG. 17 illustrates a method of controlling the drone 200 depending on illumination according to an embodiment of the present invention.

FIG. 17a shows the mobile terminal 100. As described above, the drone 200 can move according to operation of the mobile terminal 100. The drone 200 can sense ambient illumination. The drone 200 can transmit information on sensed illumination to the mobile terminal 100. Alternatively, the drone 200 may transmit various types of sensing information to the mobile terminal 100. The mobile terminal 100 can detect illumination information from received sensing information. The mobile terminal 100 can control the speed of the drone 200 according to the detected illumination information.

FIG. 17b shows the drone 200 moving in the daytime. In this case, the drone 200 or the mobile terminal 100 can detect sufficient illumination, that is, a predetermined illumination value or higher. Accordingly, the mobile terminal 100 can set a normal speed of the drone 200 for an input movement displacement. For example, the mobile terminal 100 can set the speed of the drone 200 to 10 m/s when a displacement applied to the input unit corresponds to 1 cm.

FIG. 17c shows the drone 200 moving at night. In this case, the drone 200 or the mobile terminal 100 may detect an illumination value lower than the predetermined illumination value. Upon detection of illumination lower than the predetermined illumination value, the mobile terminal 100 can decrease the speed ratio of the drone 200 with respect to a movement displacement input thereto. For example, when an input displacement corresponds to 1 cm, the mobile terminal 100 can set the speed of the drone 200 to 5 m/s. Accordingly, the speed of the drone 200 can be controlled depending on detected illumination for the input movement displacement.

When detected illumination is lower than the predetermined illumination value, as described with reference to FIG. 17c, it is difficult to identify the drone 200 with the naked eye and thus danger of accidents is high. Accordingly, the drone 200 is controlled to reduce the speed irrespective of time such as day time and nighttime when an illumination value lower than the predetermined illumination value is detected.

The aforementioned method of controlling the speed of the drone 200 with respect to an input movement displacement may be identical or similar to the aforementioned method of controlling the speed of the drone according to recognition of an object such as an obstacle.

The mobile terminal 100 instead of the drone 200 may sense illumination. Accordingly, the mobile terminal 100 can control the drone 200 using at least one of an illumination value sensed by the drone 200 and an illumination value directly sensed by the mobile terminal 100. When a difference between the illumination values exceeds a predetermined threshold value, the difference may be notified through the mobile terminal 100 such that one of the illumination values can be used to control the drone 200.

While daytime and nighttime have been described as an example with respect to illumination information, the present invention is not limited thereto. For example, the drone 200 may be controlled on the basis of detected illumination irrespective of time such as daytime or nighttime, weather such as cloudy day, rainy day or sunny day, and place such as indoor or outdoor space. For example, when the drone 200 is controlled in an indoor space, illumination information can be varied according to the number of fluorescent lamps or LED lamps around the drone 200.

The drone 200 may be controlled in this manner according to an illumination value sensed by the mobile terminal 100.

FIG. 18 illustrates a method of controlling the drone 200 upon sensing an object according to an embodiment of the present invention.

Referring to FIG. 18a, the drone 200 moves according to operation of the mobile terminal 100. The drone 200 can capture images using the camera. The drone 200 can transmit captured image data to the mobile terminal 100. The mobile terminal 100 can control the drone 20 to move at a normal speed when the captured image data include no object.

FIG. 18b shows a case in which image data captured by the drone 200 includes an object. The drone 200 can take a picture of an object using the camera. The mobile terminal 100 can detect the object from captured image data received from the drone 200. When the mobile terminal 100 detects the object, the mobile terminal 100 can decrease the speed ratio of the drone 200 for a movement displacement input through the input unit.

The drone 200 is a flying object and thus can move at a high speed. It is not easy to take a picture of an object using the drone 200 because the drone 200 moves at a high speed. Accordingly, when captured image data include an object, the mobile terminal 100 may decrease the speed of the drone 200 such that the user can easily take a picture of the object. In this case, when the object is displayed on the display of the mobile terminal 100 and the displayed object is selected, the drone 200 may be controlled in an automatic mode such that the speed and direction of the drone 200 correspond to the speed and direction of the selected object.

The drone 200 may be easily controlled to fly in a pattern using the mobile terminal 100.

Figure 19:
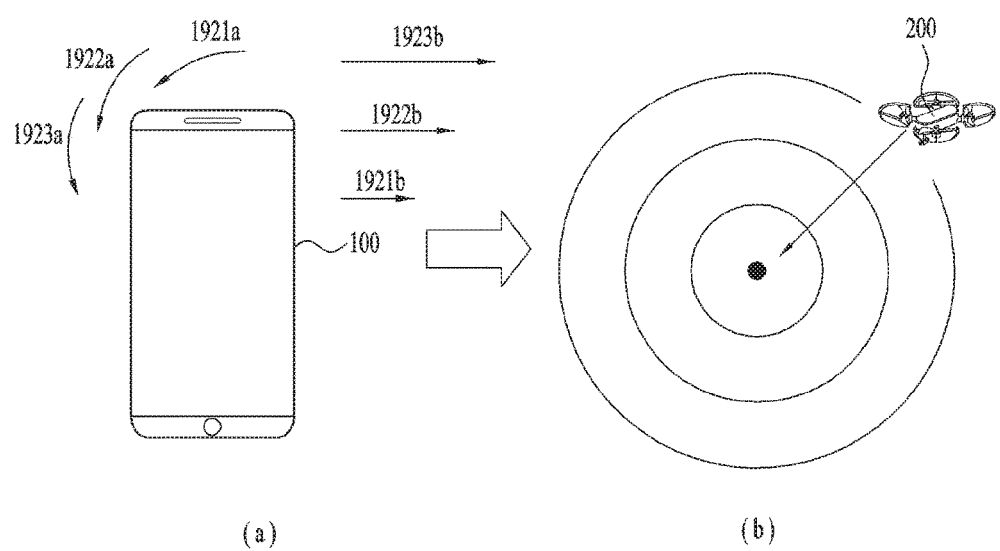
FIG. 19 illustrates a physical function of a mobile terminal set for a rotating motion of a drone according to an embodiment of the present invention.

FIG. 19 illustrates a physical function of the mobile terminal set for a rotating motion of the drone 200 according to an embodiment of the present invention.

Referring to FIG. 19a, the mobile terminal 100 may control the drone 200 to fly in a circular pattern on the basis of a reference point such as the mobile terminal 100 or a specific object. In this case, the direction of the camera of the drone 200 may be fixed. The case of fixing the camera direction may include a case in which the drone maintains the camera direction before patterned flight or moves the camera to take a picture of the reference point during patterned flight. However, it is not easy to control the drone 200 to fly in a circular pattern. Accordingly, the mobile terminal may set circular patterned flight and notify the user of a set circular patterned flight value using a physical function of the input unit.

The circular pattern flight value may be set as a plurality of sets. In an embodiment, it is assumed that the drone 200 can fly in a circular pattern with a radius of 5 m when moving to the left and right at 0.87 m/s while rotating at 10 deg/s. The mobile terminal 100 may have a physical function that provides a predetermined haptic effect for a rotational displacement of the input unit corresponding to a rotational angular velocity of 10 deg/s. In addition, the mobile terminal 100 may have a physical function that provides a predetermined haptic effect for planar displacement of the input unit corresponding to a speed of 0.87 m/s. When the user sets the input unit to parts configured to provide the predetermined haptic effects for rotational displacement and planar displacement, the drone 200 can fly in a circular pattern with a radius of 5 m. The mobile terminal may have a physical function that provides a predetermined haptic effect for a displacement of the input unit corresponding to the second circular pattern flight value through the same method. A physical function may refer to a part, a tool, a device or the like which can generate physical effects. For example, the mobile terminal 100 may include a protrusion on a handlebar shaft of the input unit and a groove which is formed on a plane in which the protrusion moves when a handlebar rotates and corresponds to the protrusion. The protrusion moves on the plane as the handlebar rotates and then enters the groove while making a predetermined sound when meeting the groove.

That is, the mobile terminal 100 may include a physical function at positions of a first rotational displacement 1921a and a first planar displacement 1921b as a circular pattern flight value of the first step, a physical function at positions of a second rotational displacement 1922a and a second planar displacement 1922b as a circular pattern flight value of the second step and a physical function at positions of a third rotational displacement 1923a and a third planar displacement 1923b as a circular pattern flight value of the third step.

FIG. 19b shows circular patterns. According to the aforementioned method, the drone 200 can fly in a circular pattern of the first step, second step or third step according to a set rotational displacement and planar displacement of the input unit.

Figure 20:
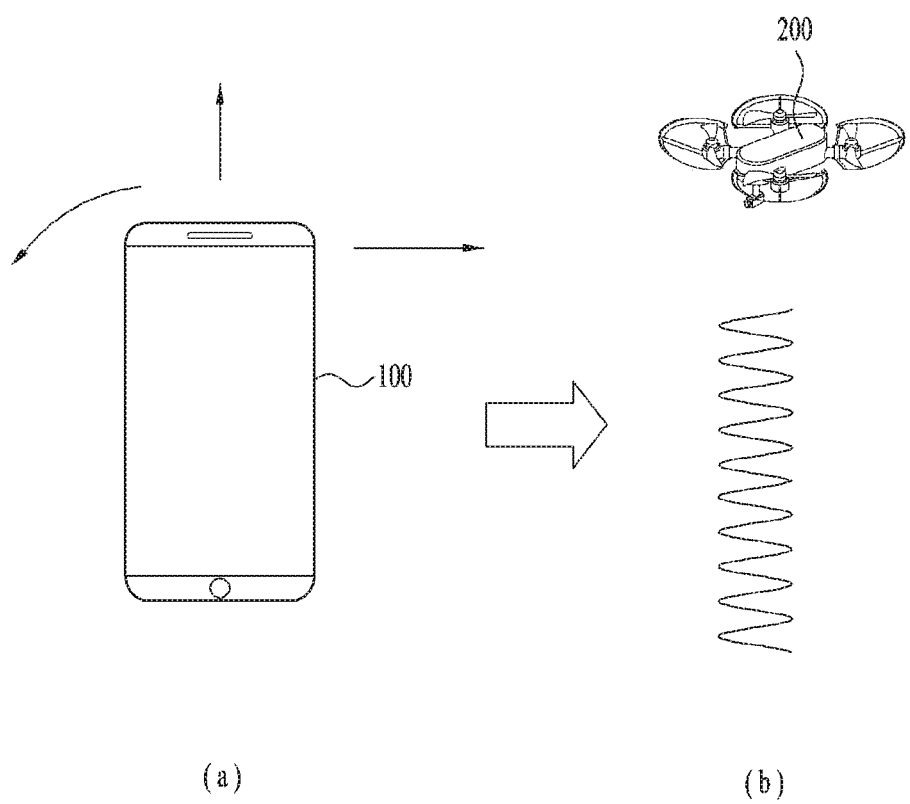
FIG. 20 illustrates a method of controlling a spiral motion of a drone using a handlebar of a mobile terminal according to an embodiment of the present invention.

FIG. 20 illustrates a method of controlling a spiral motion of the drone 200 using a handlebar of the mobile terminal according to an embodiment of the present invention.

FIG. 20a shows the mobile terminal 100. As described above, the mobile terminal 100 can control the drone 200 to fly in a circular pattern according to a set circular pattern value. In addition, the drone 200 can be controlled to move upward or downward through the input unit of the mobile terminal 100. Further, commands for a plurality of directions may be simultaneously input to the input unit of the mobile terminal 100.

FIG. 20b shows the drone 200 which performs spiral flight. As described above, the drone 200 can fly in a circular pattern according to a set circular pattern value. The user may simultaneously input a command for upward or downward movement of the drone in addition to the set circular pattern value. When the user inputs a command for upward movement in addition to the set circular pattern value, the drone 200 can fly upward while flying in a circular pattern. Consequently, the drone 200 can perform spiral flight while flying upward. The user may input a command for downward movement in addition to the set circular pattern value. When the user inputs the command for downward movement in addition to the set circular pattern value, the drone 200 can fly downward while flying in a circular pattern. Consequently, the drone 200 can perform spiral flight while flying downward.

That is, a rotational displacement and a planar displacement corresponding to a predetermined angular velocity for circular motion of the drone 200 can be input to the input unit of the mobile terminal 100. When a command for vertical movement is input to the mobile terminal 100 simultaneously with the rotational displacement and planar displacement input, the mobile terminal 100 can transmit a signal for controlling the drone 200 to perform a spiral movement to the drone 200.

FIG. 21 illustrates a method of controlling the drone 200 in a predetermined pattern according to an embodiment of the present invention.

FIG. 21a shows the drone 200 which flies in a square pattern. The mobile terminal 100 may include a patterned flight button. The drone may fly in a pattern based on a form input to the mobile terminal 100 with the patterned flight button pushed. For example, when inputs corresponding to forward and backward movement and movement to the left and right are applied to the input unit of the mobile terminal 100 while the patterned flight button is not selected, the drone 200 moves forward, backward and to the left and right but may not fly in a square pattern. However, when the patterned flight button is selected and inputs corresponding to forward and backward movement and movement to the left and right are applied to the input unit of the mobile terminal 100, the drone 200 can fly in a predetermined square pattern.

FIG. 21b shows the drone 200 which flies in a zoom-in/zoom-out pattern. Similarly to the aforementioned method, when the patterned flight button is selected and inputs corresponding to hemispherical upward movement and hemispherical downward movement are applied to the input unit of the mobile terminal 100, the drone 200 can fly in a zoom-in/zoom-output pattern.

The drone 200 can fly in various patterns according to selection of the patterned flight button and setting of the user.

Meanwhile, the moving direction of the drone 200 may not correspond to the direction of the camera. A description will be given of a method of controlling the drone 200 when the moving direction of the drone 200 does not correspond to the direction of the camera.

Figure 22:
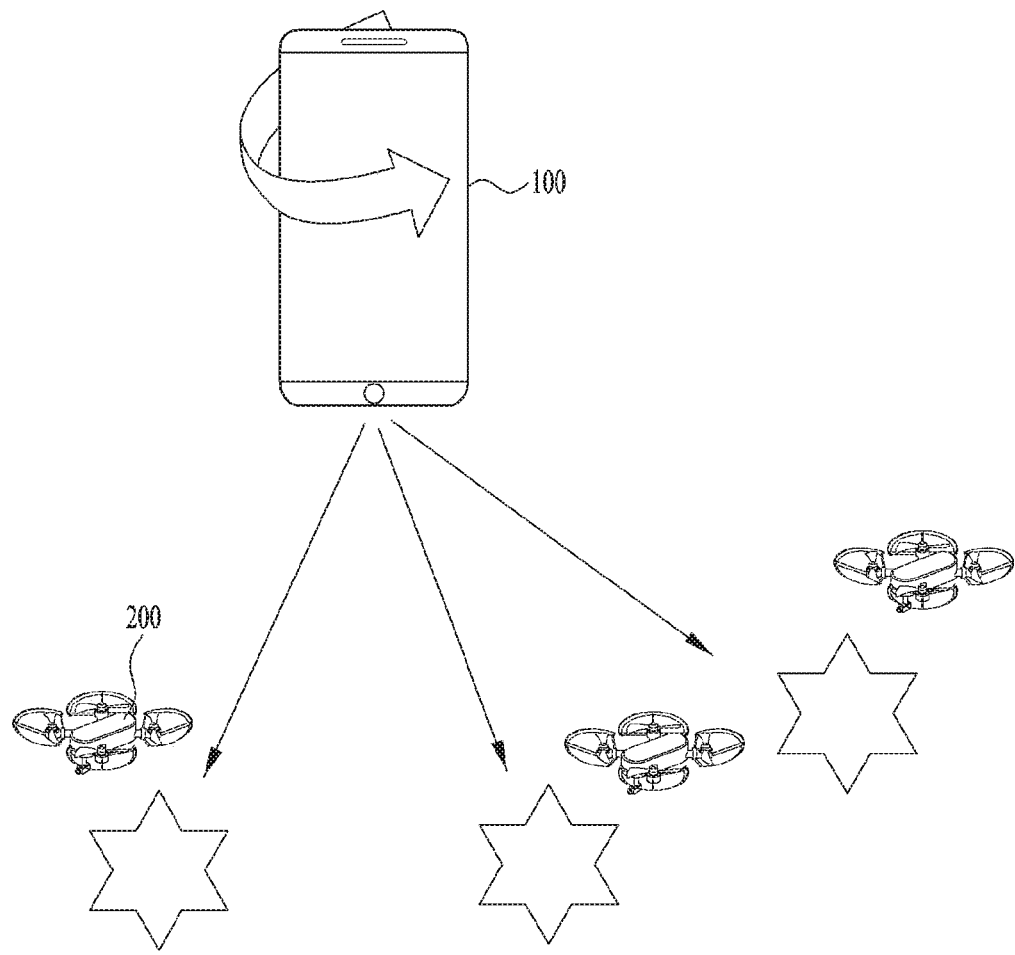
FIG. 22 illustrates a method of controlling a drone using light according to an embodiment of the present invention.

FIG. 22 illustrates a method of controlling the drone 200 using light according to an embodiment of the present invention.

The output unit of the mobile terminal 100 may emit light. For example, the mobile terminal 100 may emit a laser or light having a predetermined wavelength. The drone 2000 may sense light emitted from the mobile terminal 100. The drone 200 may move according to the sensed light. Accordingly, the user can control the drone 200 more intuitively. Different types of light may be emitted from the mobile terminal 100, for example, depending on events generated in the mobile terminal 100. Here, different types of light may refer to lights having different colors, intensities and/or incident angles.

Various embodiments of the mobile terminal 100 have been described. A flow of a method of controlling the mobile terminal will be described.

The mobile terminal 100 may receive data from the drone 200. For example, the mobile terminal 100 can receive image data captured by the drone 200, sensing data sensed by the drone 200 or the like. The mobile terminal may include a display and display the received image data thereon.

The mobile terminal 100 may detect an object and calculate a distance between the drone 200 and the obstacle on the basis of received data. The mobile terminal 100 may detect an object from received image data and calculate a distance between the drone 200 and the obstacle. Alternatively, the mobile terminal 100 may detect an object from received sensing data and calculate a distance between the drone 200 and the obstacle. Alternatively, the drone 200 may detect an object, calculate a distance between the drone 200 and the obstacle and transmit the calculated data to the mobile terminal 100.

When the calculated distance between the drone 200 and the obstacle is equal to or shorter than a predetermined distance, the mobile terminal 100 may output a predetermined signal. The predetermined signal may include at least one of a signal for outputting vibration and a signal for providing a haptic effect for a direction in which the user applies force in order to control the drone 200.

The mobile terminal 100 may decrease the speed of the drone 200 corresponding to the operation range of the input unit as the distance between the drone 200 and the obstacle decreases. The user can intuitively control the drone 200 using the mobile terminal 100 and stability of motion of the drone 200 can be improved through the aforementioned various embodiments.

Figure 23:
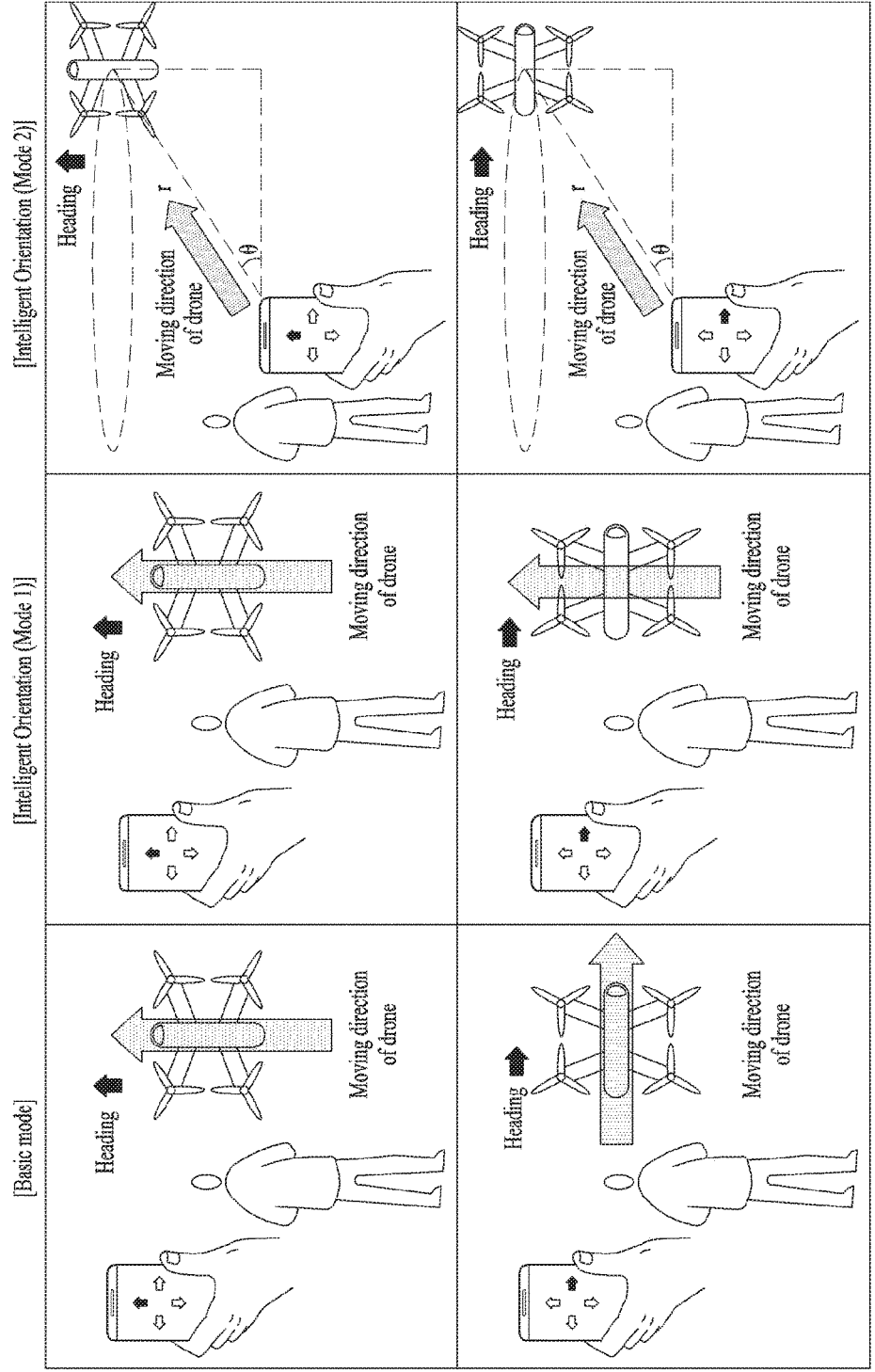

FIGS. 23 and 24 illustrate a method of control motion of the drone 200 using the mobile terminal 100 according to an embodiment of the present invention.

A description will be given of a method of controlling operation of the drone 200 according to inputs for forward/backward movement, movement to the left/right, upward/downward movement and rotation, which are applied to the mobile terminal 100, with reference to FIGS. 23 and 24.

Control of motion of the drone 200 according to drone operation control inputs applied through the mobile terminal 100 may be divided into a basic mode and an intelligent orientation mode. The basic mode and the intelligent orientation mode may be determined, for example, according to a state in which an event is not generated in the mobile terminal 100 and a state in which an event has been generated in the mobile terminal 100.

Referring to FIG. 23, the intelligent orientation mode may be divided into a first mode and a second mode. The first mode may be based on a rectangular coordinate system and the second mode may be based on the polar coordinate system, as shown in FIGS. 23 and 24b. In the second mode, particularly, operation is performed on the basis of the distance r and angle θ between the mobile terminal 100 and the drone 200.

Referring to FIG. 24, in the basis mode, a moving direction of the drone 200 is determined according to a drone operation control input, for example, on the basis of the heading of the drone 200. For example, if the heading of the drone 200 is 3 o'clock, the drone 200 continuously moves forward in the heading when the user transmits a command for forward movement of the drone 200.

Referring to FIGS. 23 and 24a, in the first mode of the intelligent orientation mode, the drone 200 is controlled on the basis of a reference angle according to a drone operation control input. The reference angle may refer to the heading of the drone 200 when the drone 200 initially takes off. For example, if a command for forward movement of the drone 200 is transmitted from the mobile terminal 100 when the reference angle of the drone 200 is 12 o'clock (0°) and the current heading of the drone 200 is 3 o'clock (−90°), the drone 200 moves forward on the basis of the reference angle, that is, moves in the direction of 12 o'clock. In this case, heading of the drone 200 is continuously maintained. Here, the drone 200 corrects the direction or angle thereof from the current heading (−90°) to the reference angle (0°). Such correction may be performed by the drone 200 or the mobile terminal 100.

Referring to FIGS. 23 and 24b, in the second mode of the intelligent orientation mode, operation of the drone 200 is controlled by changing at least one of the distance r and the angle θ depending on a drone operation control input. For example, when a command for forward movement is received from the mobile terminal 100 in order to control operation of the drone 200 located at a distance r1 from the mobile terminal 100 and having a heading of 3 o'clock (θ1), the distance r1 is changed with the angle θ1 maintained. In the case of the command for forward movement, the distance r1 is changed to a distance r2. Here, r1 is shorter than r2. In the case of a command for backward movement, r2 is shorter than r1 and the angle θ1 is maintained. When a command for movement to the left is received, the distance r1 is maintained and the angle θ1 is changed. For example, when the heading of the drone 200 is 3 o'clock, the drone 200 moves circularly with the distance r1 maintained and the angle θ1 changing counterclockwise according to the command for movement to the left. Similarly, in the case of a command for movement to the right, the drone 200 moves circularly with the distance r1 maintained and the angle θ1 changing clockwise.

The above description is based on the assumption that the mobile terminal 100 is fixed from when the drone 200 initially takes off.

Here, if the fixed state of the mobile terminal 100 is cancelled, that is, the mobile terminal 100 moves, for example, additional correction according to movement of the mobile terminal 100 is required in the case of the first mode of the intelligent orientation mode.

When the mobile terminal 100 moves in the direction of 9 o'clock at the initial takeoff time of the drone 200 on the aforementioned assumption related to correction of motion of the mobile terminal 100 in the first mode, the drone 200 moves in the direction of 9 o'clock differently from the case in which the mobile terminal 100 is fixed.

The drone 200 can move forward, backward, upward, downward, to the left or to the right under the control of the mobile terminal 100. Here, the drone 200 can operate as illustrated in FIG. 24a or 24b in response to input or control of the mobile terminal 100. At least one of the heading of the drone 200, the distance r and angle θ between the mobile terminal 100 and the drone 200 is referred to for operation of the drone 200.

FIG. 25 illustrates a method of controlling a rotational motion of the drone 200 using the mobile terminal 100 according to the present invention.

The mobile terminal 100 may provide a UI for intuitive drone control when an event is generated, as illustrated in FIG. 25.

A description will be given of control of operation of the drone 200 through rotational input through the input unit 120 with reference to FIG. 25. Here, operation of the drone 200 is controlled by changing only an angle value θ according to the rotational input while fixing the distance r between the drone 200 and the mobile terminal 100.

A method of controlling operation of the drone 200 according to rotation input may include an absolute angle control method illustrated in FIG. 25a and a relative angle control method illustrated in FIG. 25b.

A description will be given of the absolute angle control method and the relative angle control method with reference to FIG. 25.

In FIG. 25a, when the user applies −90° rotational input from a point A (direction of 12 o'clock) to a point B (direction of 3 o'clock), the coordinates of the drone 200 are changed from (r1, θ1) to (r1, θ2) (here, θ2=−90°). This is referred to as the absolute angle control method. In the case of FIG. 25b, the coordinates (r1, θ1) of the drone 200 are changed to (r1, θ2) (here, θ2=θ1−90°). This is referred to as the relative angle control method. Modes with respect to such rotation angle control methods can be changed according to selection or setting.

The input rotation angle θ may be displayed on the display 151 in real time. Accordingly, it is possible to easily and conveniently control a rotating motion or operation of the drone 200 through rotational input according to the present invention compared to lever rotation of a conventional drone operating device. For example, in order to rotate the drone 200 by an angle θ1 by rotating a lever, the user needs to continuously rotate the lever until the drone 200 moves by the angle θ1 and maintain the state. According to the present invention, however, the user just applies rotational input of a desired angle. For convenient rotational input, the display 151 may provide an angle corresponding to rotational input as a numerical value.

Control of a rotating motion of the drone 200 may be used for a simple operation such as taking a picture using the camera included in the drone 200.

Figure 26:
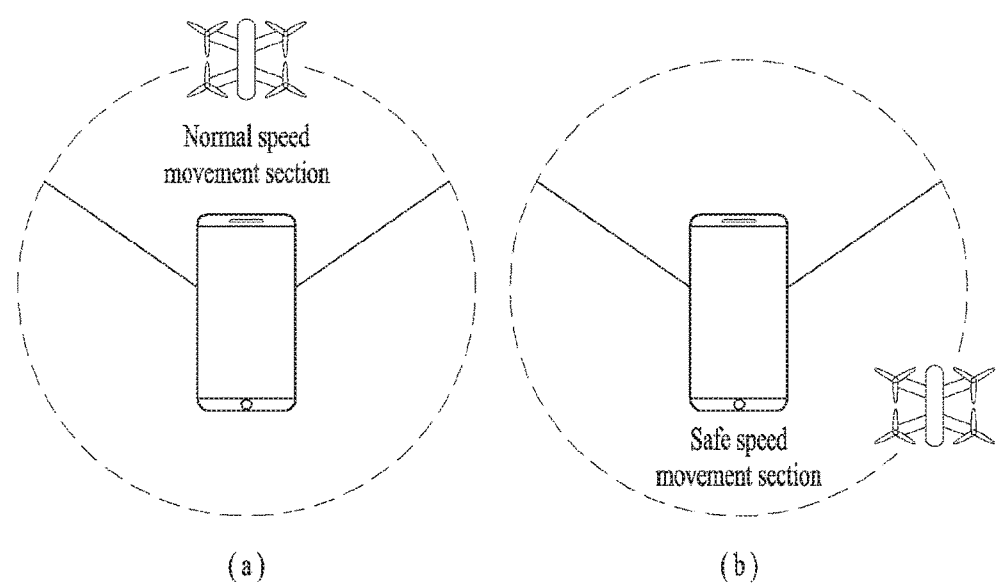
FIG. 26 illustrates a method of controlling the speed of a drone using polar coordinates according to the present invention.

FIG. 26 illustrates a method of controlling the speed of the drone 200 using a polar coordinate system according to the present invention.

FIG. 26a illustrates a speed control method when an event is not generated in the mobile terminal 100 and FIG. 26b illustrates a speed control method when an event is generated in the mobile terminal 100.

The user may set speed control of the drone 200 depending on an azimuth difference or angle θ between the drone 200 and the mobile terminal 100. For example, the drone 200 can be controlled to move at a normal speed when the azimuth difference or angle θ between the drone 200 and the mobile terminal 100 is within a predetermined azimuth difference or angle θ, whereas the drone 200 can be controlled to move at a predetermined speed when the azimuth difference or angle θ between the drone 200 and the mobile terminal 100 is equal to or greater than the predetermined azimuth difference or angle θ. The predetermined azimuth difference or angle θ can be changed according to setting of the mobile terminal 100 or selection of the user and may be plus/minus 30°.

When the drone 200 is located or is moving within the predetermined azimuth difference or angle θ from the basis of the mobile terminal 10, as shown in FIG. 26a, the drone 200 is controlled to move at the normal speed. Here, the normal speed refers to a moving speed that the user requests without restricting the moving speed of the drone 200.

On the contrary, when the drone 200 is located beyond the predetermined azimuth difference or angle θ from the basis of the mobile terminal 10 or continuously moves at the corresponding location, as shown in FIG. 26b, the speed of the drone 200 is limited to a predefined speed irrespective of a moving speed of the drone 200 requested by the user. In this case, the mobile terminal may immediately limit the moving speed of the drone 200 to the predefined speed or may gradually reduce the moving speed of the drone 200 to the predefined speed.

Meanwhile, the mobile terminal 100 continuously detects the position of the drone 200 on the basis of the polar coordinate system based on the mobile terminal 100 through period/aperiodic data communication with the drone 200.

Even when it is determined that the drone 200 is located or is moving within a predetermined range from the predetermined azimuth difference or angle θ from the result of detection of the position of the drone 200, the mobile terminal 100 may control the moving speed of the drone 200 in stages on the basis of the speed or heading of the drone 200. When the drone 200 is located or is moving within the predetermined range, the mobile terminal 100 may notify the user of the location or motion of the drone 200, the fact that the drone 200 will move out of the predetermined azimuth difference or angle θ, and the like through vibration, sound or a message displayed on the display.

In addition, a process of recognizing a gesture of the user through the mobile terminal 100 may be based on the polar coordinate system, which is not shown in the figure. For example, it is possible to control the drone 200 on the basis of a gesture and the polar coordinate system through the mobile terminal 100 by obtaining roll, pitch and yaw values of the mobile terminal 100 from data obtained by sensing the gesture through sensors included in the mobile terminal 100 or a display device and using the obtained values as control input for the drone 200.

The mobile terminal 100 according to the present invention may intuitively control all operations of the drone 200 such as upward/downward movement, movement to the left and right, forward/backward movement and rotation through the input unit. For upward/downward movement or rotation of the drone 200, a volume up/down key button provided to the rear side or one side of the mobile terminal may be used instead of the input unit.

Figure 27:
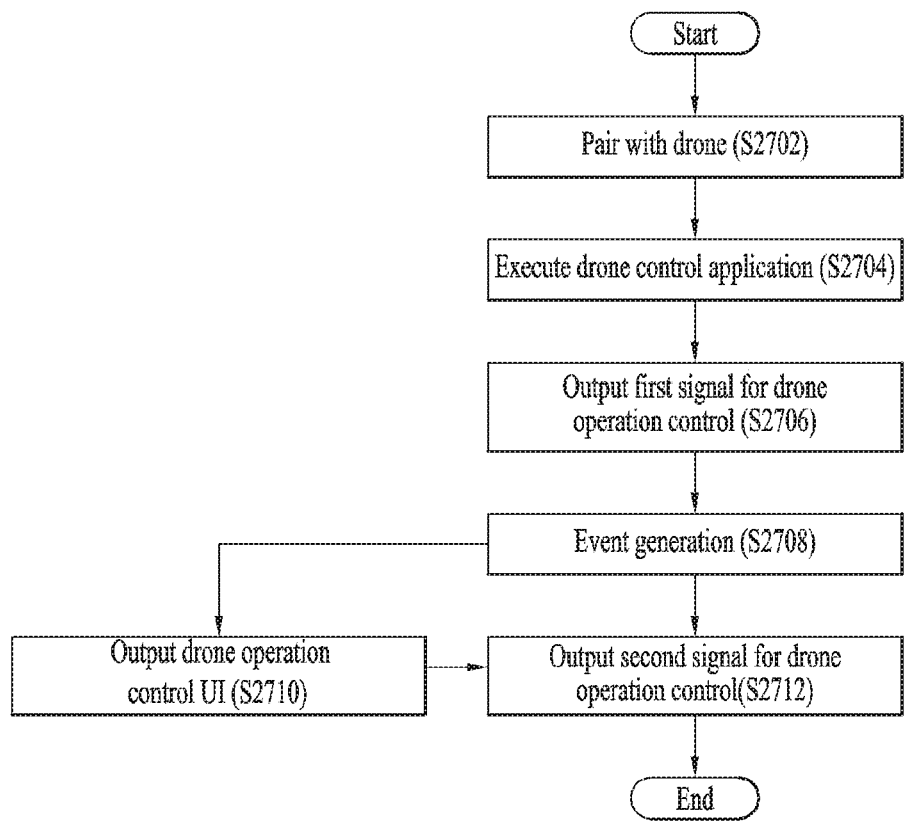
FIG. 27 is a flowchart illustrating a method of controlling operation of a drone using a mobile terminal according to an embodiment of the present invention.

FIG. 27 is a flowchart illustrating a method of controlling operation of a drone using a mobile terminal according to an embodiment of the present invention.

The mobile terminal pairs with the drone (S2702) and executes a drone control application (S2704). Here, execution of the drone control application may not be a mandatory process. For example, the drone can be controlled through the mobile terminal without execution of the drone control application. Further, the process of paring with the drone may be automatically performed simultaneously with the drone control application execution process or upon reception of a drone control application execution request.

The mobile terminal outputs a first signal for drone operation control to the drone to control operation of the drone (S2706).

When an event is generated (S2708), the mobile terminal may provide a predefined drone operation control UI (S2710) or output a second signal for drone operation control to the drone (S2712) according to the generated event. Only one of steps S2710 and S2712 may be performed, or the two steps may be simultaneously or sequentially performed.

According to at least one of the aforementioned embodiments of the present invention, it is possible to operate a drone more safely using a mobile terminal of a user and stably control the drone even in various situations and events of the mobile terminal for drone control. Furthermore, it is possible to control the drone using the mobile terminal without additional costs and control the drone while using functions of the mobile terminal. Accordingly, utilization convenience can be improved and drone control stability can be secured.

The present invention can be embodied as computer-readable code on a computer-readable recording medium. The computer-readable recording medium includes all data storage devices that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (such as data transmission over the Internet). The computer may include the controller of the mobile terminal. Therefore, the above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A mobile terminal comprising:
    a communication unit for transmitting and receiving data to and from a drone;
    an input unit for receiving a first signal for controlling an operation of the drone;
    a display for displaying at least one of data received from the drone or a User Interface (UI) for the operation control of the drone; and
    a controller operably coupled with the communication unit, the input unit, and the display, wherein the controller is for:
        executing an application for the operation control of the drone;
        transmitting the received first signal to the drone;
        transmitting a second signal for controlling an operation of the drone to the drone according to generation of a predetermined event; and
        identifying a user using fingerprint data when the predetermined event is receiving the fingerprint data,
    wherein the display displays the UI differently based on whether the fingerprint data is received via a home button or via a touchscreen of the display.

2. The mobile terminal according to claim 1, wherein the controller controls the second signal to vary according to the predetermined event, causes the display to display the UI based on a type of the predetermined event and determines the second signal to be transmitted through the displayed UI.

3. The mobile terminal according to claim 2,
    wherein, when the identified user has no authority to control operation of the drone, the controller controls the drone to maintain a first position, or to land at a second position,
    wherein the first position includes a location and an altitude of the drone when the controller receives the fingerprint data,
    wherein the second position includes a location of the drone when the controller receives the fingerprint data, a location of the mobile terminal when the controller receives the fingerprint data, an initial take off location of the drone, or a predetermined location for landing, and
    wherein, when the identified user has authority to control operation of the drone, the UI includes detailed function items related to operation control of the drone, and the controller finishes operation control of the drone or controls the drone to maintain a location and an altitude when the controller receives the fingerprint data or moves to a predetermined location and altitude for standby until next fingerprint data is received.

4. The mobile terminal according to claim 3, wherein the controller provides the UI according to force-touch input in response to the force-touch input received after the fingerprint data is received or received along with the fingerprint data, wherein the UI includes at least one of altitude control or forward/backward movement control according to the force-touch input, and wherein, when a drag signal is received along with the force-touch input, the controller controls the drone to move in a direction corresponding to the received drag signal.

5. The mobile terminal according to claim 4, wherein the controller:

transmits a result of identification of the user of the fingerprint data to the drone according to the received fingerprint data;

receives a feedback signal from the drone according to whether the user has the authority to control operation of the drone; and outputs at least one of a haptic effect, pop-up data, or audio data in response to the received feedback signal.

6. The mobile terminal according to claim 3, wherein:

the predetermined event is execution of a text or call application;

the controller provides the UI or transmits a control signal according to voice or gesture input of the user of the mobile terminal; and the UI or the control signal includes at least one of lowering altitude, landing, takeoff, increasing altitude, execution of around-view, moving to a target at a fixed position and a fixed altitude, or capturing a selfie.

7. The mobile terminal according to claim 3, wherein:

the event corresponds to execution of a camera application; and the controller:

activates at least one camera of the drone including a plurality of cameras according to the execution of the camera application;

requests reception of a captured image of the drone;

causes the display to display image data received from the drone; and controls an angle of the drone or at least one camera included in the drone according to selection of the displayed image data.

8. The mobile terminal according to claim 3, wherein;

the predetermined event is related to a battery state and battery charge is lower than a predetermined threshold value; and the controller:

provides the UI or transmits a control signal for controlling the drone to perform a predetermined operation;

periodically transmits the location of the mobile terminal until the mobile terminal is turned off due to battery or detects another mobile terminal for controlling the drone around the drone or the mobile terminal; and determines whether the detected mobile terminal is a registered device and has the authority to control operation of the drone.

9. The mobile terminal according to claim 3, wherein the drone maintains the location and altitude for a predetermined time or lands at an initial takeoff place, the location, or a predetermined landing position when a control signal is not received for a predetermined time or connection between the drone and the mobile terminal is abruptly cancelled.

* * * * *